(12) United States Patent
Khalil et al.

(10) Patent No.: US 6,430,698 B1
(45) Date of Patent: Aug. 6, 2002

(54) VIRTUAL DISTRIBUTED HOME AGENT PROTOCOL

(75) Inventors: Mohamed Khalil, Dallas; Emad Qaddoura, Plano; Carey Becker, Plano; Russel Coffin, Plano; Haseeb Akhtar, Garland, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/324,322

(22) Filed: Jun. 2, 1999

Related U.S. Application Data

(60) Provisional application No. 60/103,094, filed on Oct. 5, 1998.

(51) Int. Cl.[7] .................. G06F 15/173; G06F 13/42; G06F 11/07; H04L 12/28; H04B 7/00
(52) U.S. Cl. .................. 714/4; 709/201; 455/6.3; 710/105
(58) Field of Search ................... 714/4; 710/105; 709/238, 201; 379/219, 90.01; 725/113; 455/6.3, 3.2, 418, 517, 426; 707/104; 370/352, 464, 310, 901, 469, 912, 400

(56) References Cited

U.S. PATENT DOCUMENTS

| | | | |
|---|---|---|---|
| 5,862,345 A | * | 1/1999 | Okanouue et al. |
| 5,960,073 A | * | 9/1999 | Kikinis et al. |
| 6,160,804 A | * | 12/2000 | Ahmed et al. |
| 6,215,779 B1 | * | 4/2001 | Bender et al. |
| 6,219,348 B1 | * | 4/2001 | Allen, Jr. et al. |

* cited by examiner

Primary Examiner—Gopal C. Ray
(74) Attorney, Agent, or Firm—Kenneth W. Bolvin; Bracewell & Patterson, L.L.P.

(57) ABSTRACT

A computer protocol that manages and provides efficient communications and utilization of resources between a mobile computer system or device and other systems and devices. Each home agent maintains a home agent list containing information about each of the home agents coupled to the home link. A designated home agent on behalf of the home agents for a virtual home agent is used to send and broadcast home agent advertisement, to receive and process a request from a mobile node, to process and send a reply to the mobile node. Synchronization mechanisms or tools, such as home agent priority or floating token method, are provided for proper operation of a Virtual Distribution Home Agent Protocol (VDHAP). These mechanisms or tools are used to fairly distribute loads from the mobile node among the home agents within the virtual home agent.

18 Claims, 20 Drawing Sheets

Fig. 4 *Prior Art*

VIRTUAL DISTRIBUTED HOME AGENT PROTOCOL

This Non-Provisional Application claims the benefit of U.S. Provisional Application No. 60/103,094 filed on Oct. 5, 1998.

BACKGROUND OF THE INVENTION

1. Technical Field

The present invention relates in general to a computer protocol and in particular to a virtual distributed home agent protocol which is a mobile internet protocol (IP) that manages and provides efficient communications and utilization of resources between a mobile computer system or device and other systems and devices, especially when the mobile computer system or device has moved from one location to another location.

2. Description of the Related Art

Computers or computer systems/devices that communicate with each other over the Internet and a home network require the use of a protocol or Internet protocol (IP) FIG. 1 is a prior art figure of a mobile computer 10 in communications with a home network 12 at one location which is moved to another location that is in communications to the Internet 14. The configuration in FIG. 1 requires a base mobile Internet protocol (IP) for providing and routing communications between computer systems and devices, especially when the mobile computer 10 has moved from one location to another location (i.e. moved from being in communication with the home network 12 to being in communication with the Internet 14). However, inefficiencies, load distribution problems, and error and failure recovery problems exist with current protocols, such as the base mobile Internet protocol (IP). Also, present protocols do not provide back up and recovery methods for providing home agent services to a mobile node(s) in the event that the home agent of the mobile node(s) has failed.

In discussing these protocols, the following terms are generally defined:

"Mobile Node" is a host or router that changes its point of attachment from one network or sub-network to another network or sub-network. A mobile node may change its location without hanging its IP address, and it may continue to communicate with other Internet nodes at any location using its (constant or fixed) IP address, assuming link-layer connectivity to a point of attachment is available.

"Home Agent" is a router on a mobile node's home network which tunnels datagrams for delivery to the mobile node when it is away from home and maintains current location information for the mobile node. The home agent has three main operations: 1) sending agent advertisement; 2) receiving a home agent discovery request and processing the discovery request; 3) receiving a registration request and processing the registration request.

"Foreign Agent" is a router on a mobile node's visited network, which provides routing services to the mobile node while registered. The foreign agent detunnels and delivers datagrams to the mobile node that were tunneled by the mobile node's home agent. For datagrams sent by a mobile node, the foreign agent may serve as a default router for registered mobile nodes.

"Agent Advertisement" is an advertisement message constructed by attaching a special Extension to a router advertisement message.

"Care-of Address" is the termination point of a tunnel toward a mobile node, for datagrams forwarded to the mobile node while it is away from home. The protocol is able to use two different types of care-of address: a "foreign agent care-of address" is an address of a foreign agent with which the mobile- node is registered and a "co-located care-of address" is an externally obtained local address which the mobile node has associated with one of its own network interfaces.

"Correspondent Node" is a peer which is communicating with a mobile node. A correspondent node may be either mobile or stationary.

"Home Address" is an IP address, that is assigned for an extended period of time to a mobile node. It remains unchanged regardless of where the node is attached to the Internet.

"Home Network" is a network, possibly virtual, having a network prefix matching that of a mobile node's home address. Standard IP routing mechanisms will deliver datagrams destined to a mobile node's Home Address to the mobile node's Home Network.

"Link" is a facility or medium over which nodes are able to communicate at the link layer. A link underlies the network layer.

"Mobility Agent" is either a home agent or a foreign agent.

"Mobile Node's Failure Recovery Information" is the minimal amount of information required to recover the mobile node's operation if its serving home agent failed. The mobile node's failure recovery information should contain at least a mobile node's care-of address, mobile node's home IP address, registration lifetime, and registration flags.

"All Home Agents Multicast Address" is a D class address (multicast address) which is assigned to the set of home agents on the Internet Service Provider (ISP) network. It is recommended for mobile nodes to use this address to access home agents instead of subnet-directed broadcast address for efficiency reasons.

Computer networks and Internet links have been in existence for several years. Also, wireless access and communications to these networks and to the Internet have also been in use. However, current protocols which handle and deal with communications of mobile computers to the Internet and network, such as base mobile IP, result in various problems. and shortcomings when used by computer systems and devices.

One problem is that present protocols inefficiently use wireless access and communication resources and network resources. For example, prior art FIGS. 2 and 3 show a mobile computer 10 with a mobile node 11 that communicates through the Internet 14 having a relatively low bandwidth to a home network 12 having a relatively large or infinite bandwidth. Current protocols make use of dynamic home agent address resolution or dynamic home agent discovery algorithms. A mobile node 11 registers directly with its home agent 16. However, the mobile node 11 may not know the IP address of its home agent 16, and the mobile node 11 then uses the dynamic home agent resolution or dynamic home agent discovery algorithms to automatically determine the IP address of its home agent 16. In this case, as shown in prior art FIG. 2, the mobile node 11 must perform a home agent discovery request wherein the mobile node 11 sets the home agent subnet-directed broadcast address of the mobile node's home network 12 and sends the registration request to each home agent 16. All of the home agents 16 receiving the registration request must reply as shown in prior art FIG. 3. Each home agent 16 already having a broadcast destination address (or registered mobile node 11) must reject the mobile node's registration request and return a rejection registration reply indicating its unicast IP address for use by the mobile node 11 in future registration attempts. The receipt by the mobile node 11 of all of the registration replies from the home agents 16 results in execution time inefficiencies, more complex processing, and in improper utilization of radio frequency (RF) and network bandwidth.

Another problem is that agent advertisement must be used by the base mobile IP in order to detect motion and location of a mobile node 11. Prior art FIG. 4 shows mobility agents, such as home agents 16 or foreign agents, advertising their presence to a mobile node(s) 11 via agent advertisement messages. In this example, wireless networks have a set of RF channels, which is used for communication between hosts (i.e. home agents 16) and mobile nodes 11. When a host (i.e. home agents 16) wants to send a packet to a mobile node 11, the mobile node 11 is allocated one of these RF channels. Packet communication between the host (i.e. home agents 16) and. the mobile node 11 commences once one of the RF channels is allocated. Many other mobile nodes 11 would also be allocated various RF channels. If multiple home agents 16 are periodically sending agent advertisement messages, where the period between transmission, for example, is one (1) second, then low optimization of the RF bandwidth would result causing inefficient use of scarce wireless access and communication resources. A similar inefficiency problem with use of network bandwidth also exists on the network side. Thus, inefficient usage of wireless network resources, such as the use of RF channels, results if multiple home agents send agent advertisement messages.

A further problem relates to load distribution of mobile nodes 11 to home agents 16. Referring to prior art FIG. 5, mobile. computers 10 with mobile nodes 11 are coupled to a home network 12 having home agents 16, and the home agents 16 are linked to computers 18 which have correspondent nodes (CN) 20. The current protocol allows a mobile node 11 to randomly select one of the home agents 16 and then allows it to perform its registration thereto. However, the problem is that an unfair load distribution of mobile nodes 11 to home agents 16 may result as shown between the two home agents 16 in FIG. 5 since the mobile nodes 11 are allowed to randomly select the home agents 16 to which they are registering. Thus, the home agents 16 are not efficiently and/or optimally used in the current protocols.

Another problem is that if a failure or error occurs at a home agent, then present protocols do not provide for providing back up and recovery home agent services to the mobile node(s) in the event that the home agent of the mobile node(s) has failed. Thus, present protocols do not provide ways to recover from such errors or failures. The mobile node(s) has to then implement the dynamic home agent discovery algorithms to re-register the mobile node(s) 11 to a properly working home agent 16. The problem again results in the execution of inefficient and complex processes for performing the discovery home agent discovery algorithms and registration process as were discussed earlier.

Prior art FIGS. 6 to 9 are used to illustrate the error and failure recovery problem in current protocols. FIG. 6 shows the same network configuration as shown in FIG. 5 except that a failure or error has occurred at one of the home agents 16. In this instance, FIG. 7 shows that a mobile node 11 sending or broadcasting its registration requests to the home agent 16 with the failure or error occurrence, but the mobile node 11 does not receive any registration reply and thus no IP address for its home agent 16. Thus, the failure or error may not be identified for awhile. After the mobile node 11 discovers the failure or error, it then realizes that it must re-register to a new home agent 16. The mobile node 11 executes the dynamic home agent discovery resolution or home agent discover algorithms to discover a new IP address as shown in FIG. 8. Dynamic home agent registration requests and respective registrations replies, which are the requests and replies discussed earlier for FIGS. 2 and 3, continue to be communicated until a new home agent is assigned and registered to the mobile node 11. FIG. 9 shows that mobile node 11 is registered to a new home agent 16. Thus, identification of failure or error in the current protocol is inefficient or does not exist. Also, backup or recovery methods in the event of a home agent failure or error do not exist. The manner in which home agents 16 recover from failures or errors for the current protocols are very inefficient and are not fully reliable since full recovery from the failure or error may not at times be possible. Present methods do not efficiently use communication and network resources and are time-consuming in the execution of the home agent registration processes.

It would therefore be advantageous and desirable to provide a protocol that more efficiently uses the wireless access and communications resources and the network resources, that more evenly distributes the load from mobile nodes to home agents, that provides backup and recovery home agent services to mobile node(s) in the event that a failure or error has occurred at a home agent, and that is more efficient in identifying home agent failures or errors and in recovering from these failures or errors. It would be advantageous and desirable to provide a virtual distributed home agent protocol that overcome the problems and disadvantages of the prior art protocols.

SUMMARY OF THE INVENTION

It is therefore one object of the present invention to provide a new and improved computer protocol for Internet communications and networks.

It is another object of the present invention to provide a new and improved mobile computer protocol for Internet communications and networks of mobile computers to other systems and devices.

It is a further object of the present invention to provide a protocol that more efficiently uses the wireless access and communications resources and the network resources.

It is still a further object of the present invention to provide a protocol that more evenly distributes the load from mobile nodes to home agents.

It is a still another object of the present invention to provide backup and recovery home agent services to mobile node(s) in the event that a failure or error has occurred at a home agent It is another object of the present invention to provide a protocol that is more efficient in identifying home agent failures or errors and in recovering from these failures or errors.

The foregoing objects are achieved as is now described. A virtual distributed home agent protocol that manages and provides efficient communications and utilization of resources between a mobile computer system or device and other systems and devices, especially when the mobile computer system or device has moved from one location to another location. The protocol more efficiently uses wireless access and communications resources and network resources, more evenly distributes load from mobile nodes to home agents, provides backup and recovery home agent services to mobile node(s) when a home agent has failed, and more efficiently identifies home agent failures or errors and is able to recover from these failures or errors. VDHAP encapsulates and integrates communications of home agents into a single virtual home agent. Communications and processes between the mobile node and virtual home agent are streamlined. Each home agent maintains a home agent list containing information about each of the home agents coupled to the home link. Heartbeat messages are used to communicate the information between the home agents. A designated home agent on behalf of the home agents for the virtual home agent is used to send and broadcast home agent advertisement, to receive and process a request from the mobile node, to process and send a reply to the mobile node. Synchronization mechanisms or tools, such as home agent priority or floating token method, are provided for proper operation of the VDHAP. These mechanisms or tools are used to fairly distribute loads from the mobile node among the home agents within the virtual home agent.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a virtual distributed home agent protocol which is a mobile internet protocol (IP) that manages and provides efficient communications and utilization of resources between a mobile computer system or device and other systems and devices, especially when the mobile computer system or device has moved from one location to another location. The present invention provides a protocol that more efficiently uses the wireless access and communications resources and the network resources, that more evenly distributes the load from mobile nodes to home agents, that provides backup and recovery home agent services to mobile node(s) in the event that a failure or error has occurred at a home agent, and that is more efficient in identifying home agent failures or errors and in recovering from these failures or errors. It would be advantageous and desirable to provide a virtual distributed home agent protocol that overcomes the problems and disadvantages of the prior art protocols.

Figure 10:
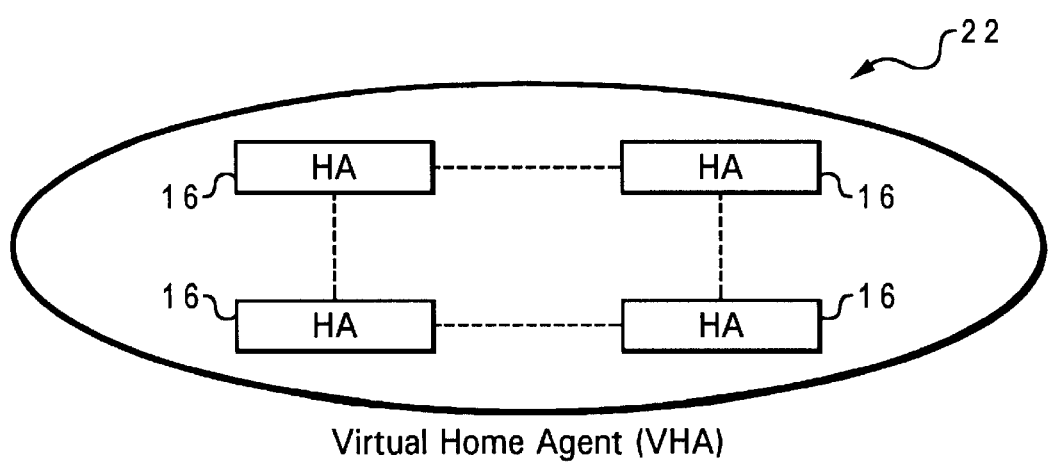
FIG. 10 is a block diagram of the virtual home agents within a home network used within the present invention virtual distributed home agent protocol.

With reference now to the figures and in particular with reference to FIG. 10, the present invention virtual home agent protocol encapsulates multiple home agents 16 into a single virtual home agent 22 from the perspective of a mobile node 11. The present invention protocol provides communications between the home agents 16 through internal or heartbeat messages, which will be discussed later in this specification. The present invention protocol also isolates utility functions, such as load distribution, backup/recovery home agent services, failure/error identification, and failure/error recovery, within the sub-network rather than performing these functions on the broad based network which tie up communication and network resources.

Figure 11:
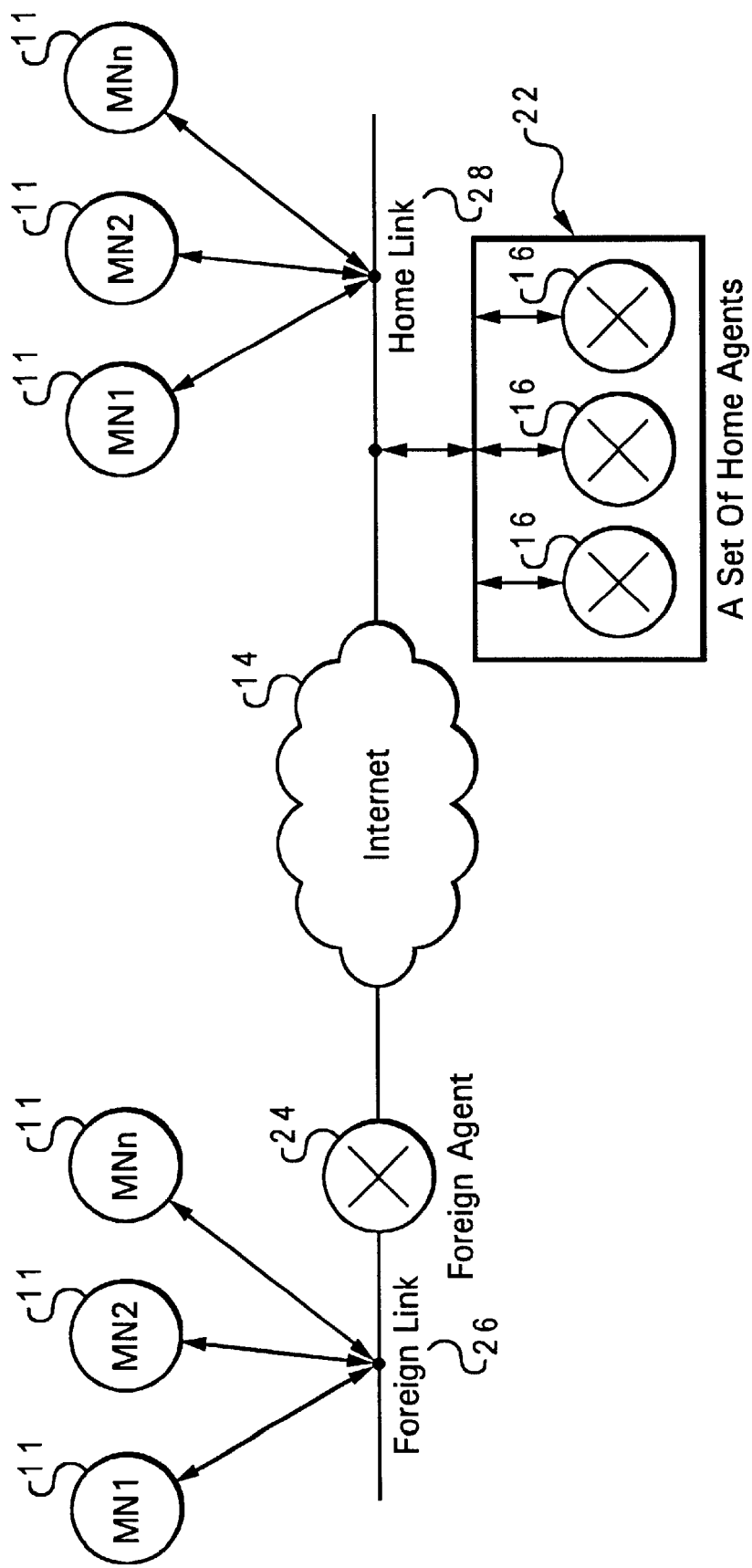
FIG. 11 is a diagram of the overall virtual distributed home agent architecture.

With reference now to the figures and in particular with reference to FIG. 11, the present invention virtual distributed home agent protocol (VDHAP) architecture is shown. VDHAP is a protocol that overcomes the problems and disadvantages discussed above. On the left side of FIG. 11, the VDHAP architecture has mobile nodes 11 linked to a foreign agent 24 via foreign link 26. The foreign agent 24 is linked and in communication with the Internet 14. On the right side of FIG. 11, the VDHAP architecture has mobile nodes 11 linked to the virtual home agent (VHA) 22 via home link 28.

As discussed earlier, a set of home agents 16 are within the VHA 22. The advantage of the VHA and VDHAP architectures is that they provide the ability to hide information. Information that is irrelevant to the outside world (i.e. the outside network or Internet) is hidden away while relevant information should be made visible. For example, home agent information, such as home agents' IP addresses, is hidden away. The hiding of such home agent information provides the following advantages: 1) In the present VDHAP architecture, a mobile node 11 is not concerned with which specific home agent 16 is providing service to it, and the mobile node 11 is only concerned about the availability of a home agent 16 when it needs service; 2) If home agents 16 are within a private network, then these home agents 16 most likely have private IP addresses that cannot be used outside of the private network, and, therefore, since a mobile node 11 cannot use the private IP addresses to establish a direct connection to any home agent 16, then hiding these addresses from a mobile node 11 will not affect its operation; 3) The load of mobile nodes 11 may need to be moved between home agents 16 to provide a more even or fair load distribution between home agents 16. Therefore, the hiding of home agent information results in the elimination of dynamic home agent address resolution algorithms, simplification of mobile node software system, efficient use of wireless communication/access and network resources, increased speed in processing of registration, simplification of mobile node configuration, decreased number of home agent advertisement messages which are sent to the air interface, and elimination of home agent IP field from the registration reply messages.

Figure 23:
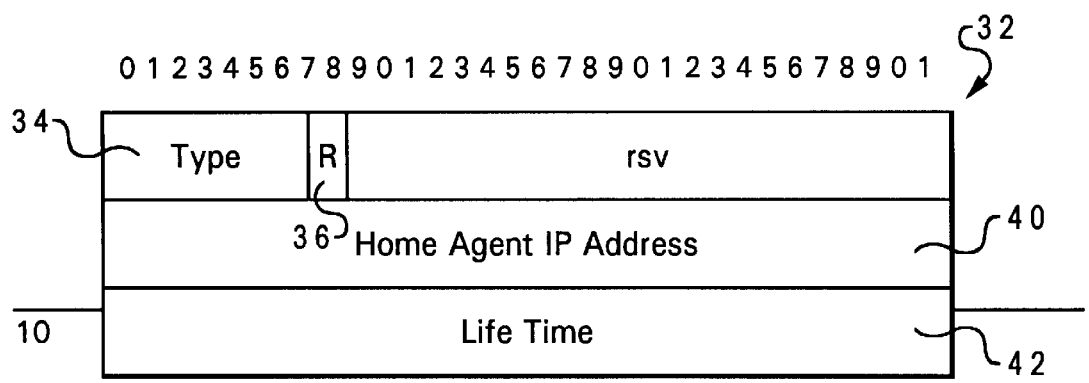
FIG. 23 is a diagram of the Heart Beat message fields.

In order to achieve proper communications within the present invention VDHAP, new messages are required to be defined. Therefore, the following new message terms are defined:

"Heartbeat Message" is a multicast message that is sent periodically by a home agent 16 to other home agents 16 in the same home link 28 or VHA 22. The message contains various characteristic information of that home agent 16 to be broadcast to the other home agents 16. The message contains source address and destination address information. The source address for the message is typically the interface address from which the message is sent (i.e. the mobile agent), and the destination address is the, "All Mobility Agents" multicast address. FIG. 23 shows the heartbeat message fields 32. The "Type" field 34 identifies the type of heartbeat message that it is. The "R" bit 36 is activated or set to an one value if the home agent 16 is configured to be a failure recovery agent as well; otherwise, it is deactivated or set to a zero value. The "Home Agent IP Address" field 40 identifies the IP address for the home agent 16. The "Life Time" field 42 indicates the life time of the home agent 16, and it should be a multiple of the period required to send the heartbeat message. If the life time of an entry expires, the home agent 16 is concluded that the corresponding home agent 16 has failed.

Figure 24:
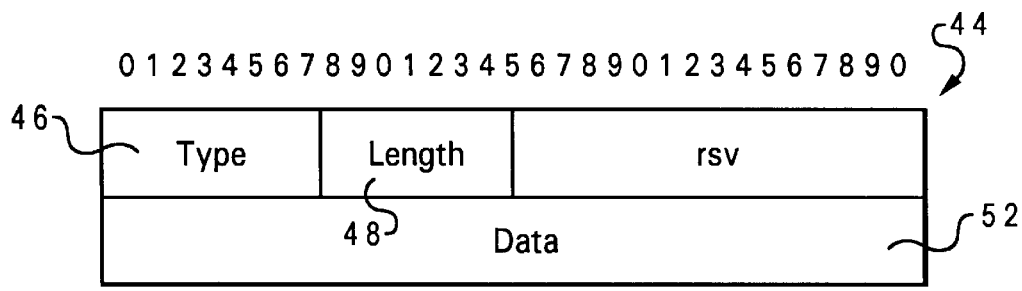
FIG. 24 is a diagram of the format of the Recovery Information Element.

"Recovery Information Element" contains recovery information that is needed by a failure recovery agent to recover from a home agent failure. The recovery information element is included in an update registration request and a recovery information ack. FIG. 24 shows the format 44 for the recovery information element. The "Type" field 46 indicates the type of recovery information element that it is, such as a CARE-OF ADDRESS, LIFETIME, MOBILE NODE HOME IP, HOME AGENT IP, IDENTIFICATION, or REGISTRATION FLAGS type. The "Length" field 48 indicates the length of the data field, and the "Data" field 52 holds the recovery information.

Figure 25:
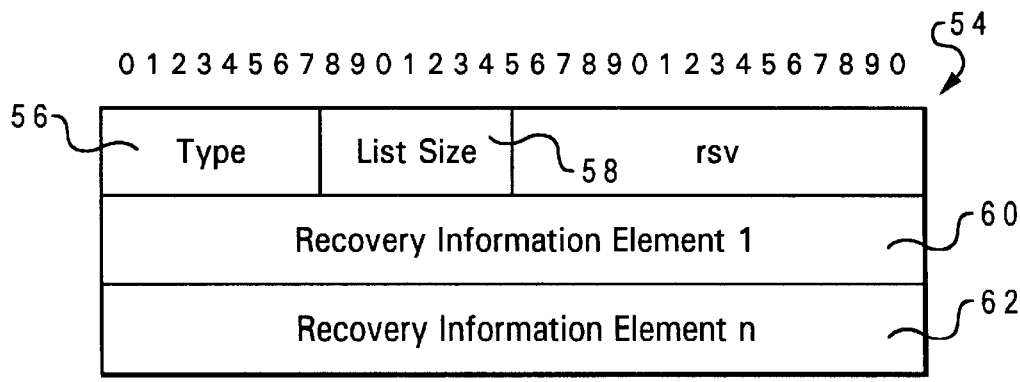
FIG. 25 is a diagram of the format of the Recovery Information Block.

"Recovery Information Block" contains multiple. recovery information elements. FIG. 25 shows the format 54 for the recovery information block. The "Type" field 56 indicates the type of recovery information block that it is. The "List Size" field 58 indicates the size of the list of recovery information elements contained in the block. The recovery information elements are contained in "Recovery Information Element" fields 60 and 62 and so on depending on the number of recovery information elements in the list.

Figure 26:
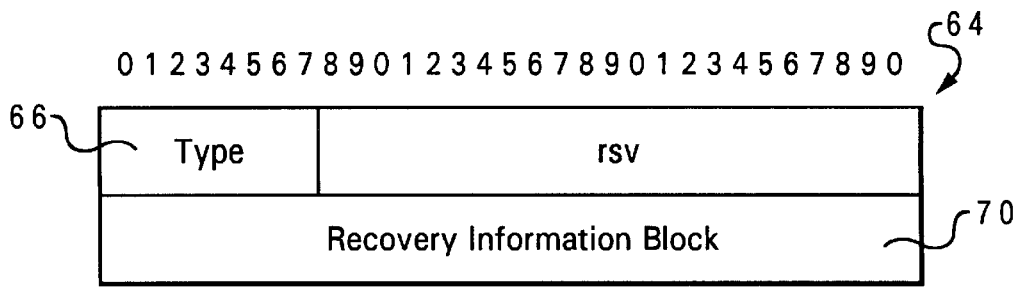
FIG. 26 is a diagram of the Update Recovery Information Request message fields.

"Update Recovery Information Request" is a unicast message that is sent to each failure recovery agent to update their failure recovery database with a mobile node's failure recovery information. The message is sent in the following scenarios: 1) when the home agent 16 is processing a registration request for a mobile node 11; 2) when the load of a mobile node 11 is transferred from one home agent 16 to another home agent 16 due to redistributing the load among home agents 16; 3) when a failure recovery agent is distributing the load of a failed home agent 16. The message must be authenticated. The source address is the interface address from which the message is sent, and the destination address is the multicast addresses for the home agents 16 on the home link 28 (i.e. providing the support as the VHA 22). FIG. 26 shows the format 64 of the update recovery information request message. The "Type" field 66 indicates the type of update recovery information request message, and the "Recovery Information Block" field 70 indicates the recovery information block that is being sent the updated recovery information.

Figure 27:
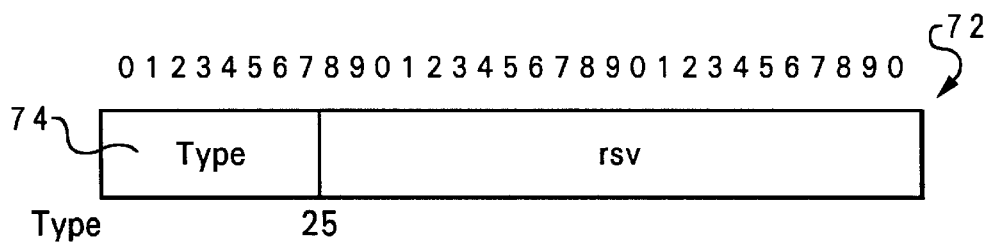
FIG. 27 is a diagram of the Recovery Information message fields.

"Recovery Information Request" is a unicast message sent by a failure recovery agent to acquire recovery information from a home agent 16 or from another failure recovery agent. This message must be authenticated. The source address is typically the interface address from which the message is sent, and the destination address is the IP address of the target home agent 16. FIG. 27 shows the format 72 of the recovery information request. The "Type" field 74 indicates the type of request that it is.

Figure 28:
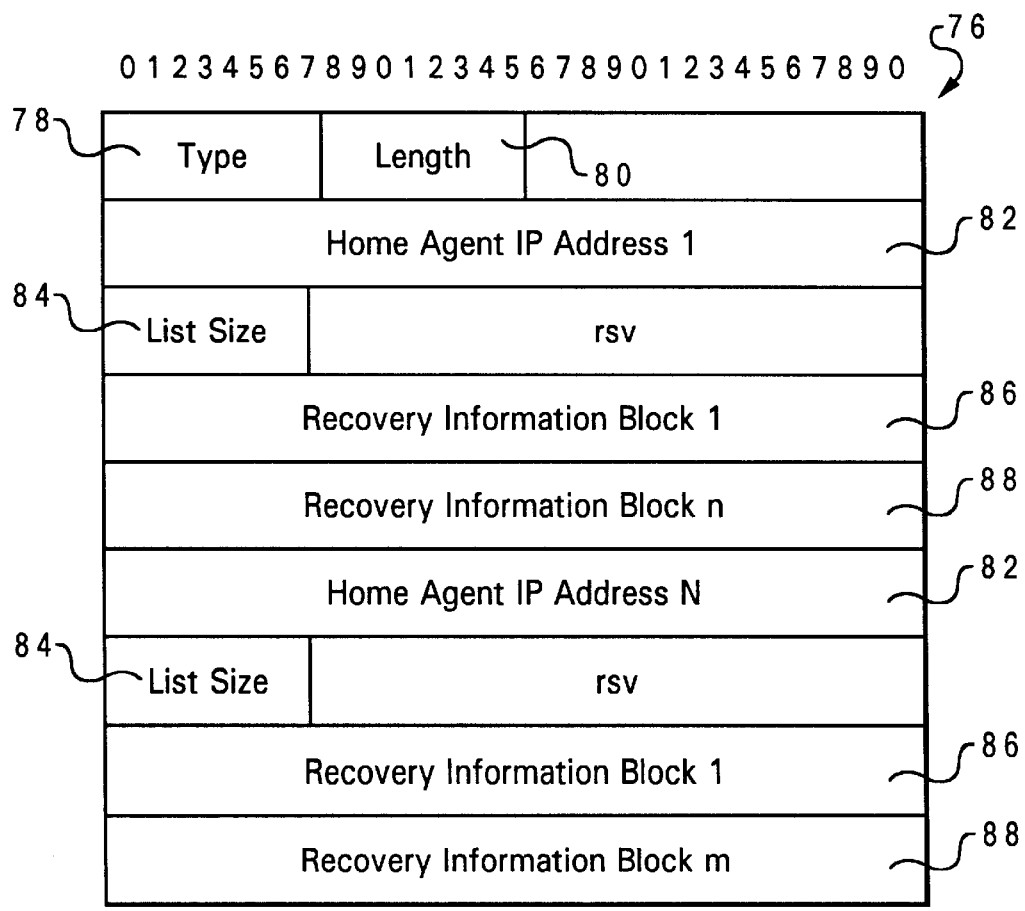
FIG. 28 is a diagram of the Recovery Information Ack message fields.

"Recovery Information Ack" is a unicast message sent by a failure recovery agent or a home agent, 16 in response to a recovery information request message. The message must be authenticated. The source address is typically the interface address from which the message is sent, and the destination address is the IP address of the failure recovery agent who sent the recovery information request message. FIG. 28 shows the format 76 of the recovery information ack. The "Type" field 78 indicates the type of recovery information ack. The "Length" field 80 indicates the length of the recovery information ack, such as the length of the list of home agent IP addresses 82. Each home agent 16 is identified by a home agent IP address 82. A list of recovery information blocks, such as blocks 86 and 88, belong to each home agent 16 identified by a home agent IP address 82. A "List Size" field 84 is associated with each home agent IP address 82 wherein the "List Size"field 84 indicates the number of recovery information blocks that belongs to each home agent 16.

Figure 29:
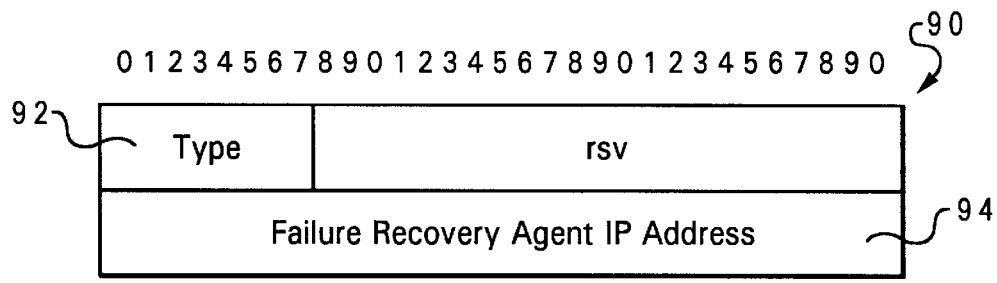
FIG. 29 is a diagram of the Token Ownership Query message fields.

"Token Ownership Query" is a unicast or multicast message that is sent by the failure recovery agent to home agent(s) 16 to acquire about the current token holder. FIG. 29 shows the format of this message. The source addresses are typically the interface addresses from which the messages are sent, and the destination address is a unicast or "All Mobility Agents" multicast address. FIG. 29 shows the format 90 for the token ownership query. The "Type" field 92 indicates the type of token ownership query. The "Failure Recovery Agent IP Address" field 94 indicates the IP address of the failure recovery agent who asks about the token ownership identity.

Figure 30:
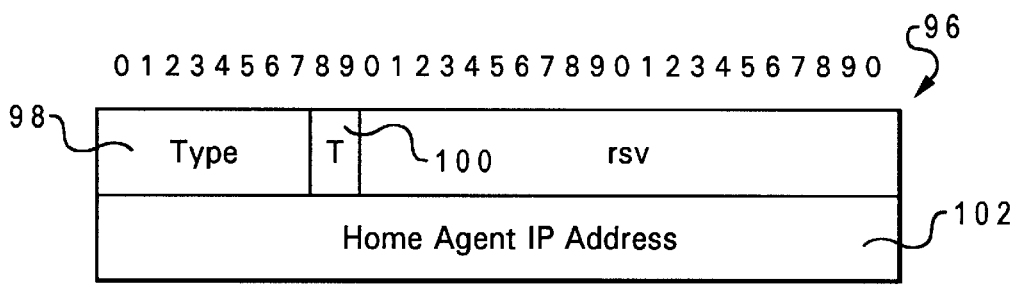
FIG. 30 is a diagram of the Token Ownership Ack message fields.

"Token Ownership Ack" is a unicast message that is sent by a home agent 16 as a response to a token ownership query message to inform a failure recovery agent whether or not the home agent 16 is the owner. The source addresses are typically the interface addresses from which the messages are sent, and the destination address is the IP address of the failure recovery agent. FIG. 30 shows a format 96 of the token ownership query message. The "Type" field 98 indicates the type of token ownership ack. The "T" bit 100 is activated and set to a one value if the home agent 16 is the token holder; otherwise, the "T" bit is deactivated and set to a zero value. The "Home Agent IP Address" field 102 is the IP address of the home agent responding to the failure recovery agent who asked about the token identity.

Basic structures and mechanisms are established for the present invention VDHAP. New conceptual data structures, such as a home agent list, is defined for the VDHAP. The home agent list is a list maintained by each home agent 16 on a home link 28. The list contains information about each other home agent 16 on the link 28 (i.e. providing the support. as the VHA 22). The information contained in this list. is learned from the unsolicited heartbeat messages, which are periodically sent by each home agent 16 serving on the link. Each home agent list entry generally has: 1) the IP address of another home agent 16 on the home link 28 (A new entry is created or existing entry is updated in the home agents list in response to receipt of heartbeat messages.); 2) the remaining lifetime of these home agents list entry (This field is initialized from the lifetime of the heartbeat messages received from the home agents 16. If a certain entry expires, the mobile nodes 11 may conclude that the corresponding home agent 16 has failed.); 3) the status of each home agent 16 (i.e. the "R" bit is a bit set to one if the home agent 16 is acting as a failure recovery agent; otherwise, the bit is set to zero).

Figure 31:
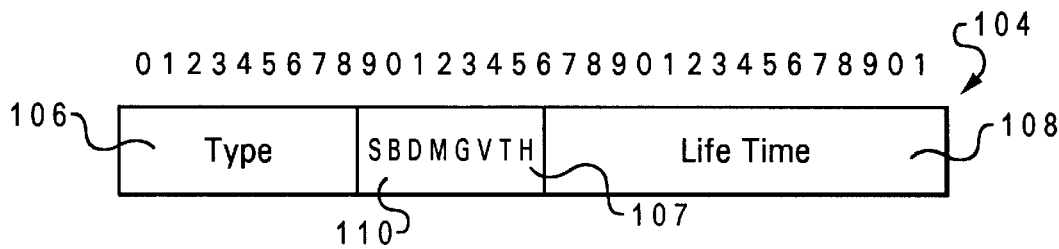
FIG. 31 is a diagram of the Registration Request message.

Another basic modification is the modified registration request. FIG. 31 shows the format 104 of the modified registration request. An "H" bit 107 is added to the flag bits 110 in the registration request message to indicate that the mobile node is implementing the present invention VDHAP. When the home agent 16 receives a registration request with a destination address assigned to the sub-net directed addresses of the home agents 16 and when the "H" bit 107 is set and activated, the home agent 16 will process the registration request according to the VDHAP registration rules, which will be discussed later in more detail. FIG. 31 shows how the registration request message, which is sent by the mobile node 11 implementing VDHAP, begins. The "Type" field 106 indicates the type of registration request message. The "Life Time" field 108 indicates the life time of the registration request message.

Home agents 16 that implement the VDHAP require synchronization mechanisms or tools to help one of the home agents 16 to perform certain tasks, such as sending of home agent advertisement messages, processing incoming registration requests, recovering from or backing up in the event of a home agent failure, etc. Two basic synchronization mechanisms or tools are provided by the present invention: 1) Home Agent Priority and 2) Floating Token.

The home agent priority requires that each home agent 16 be assigned a distinct priority. Priority is assigned to the home agent 16 based on its IP address. A selection policy based on home agent priority is used to select a failure recovery agent among several home agents 16 when a recovery from a failure of a home agent 16 needs to be implemented. Also, a similar policy is used to define which home agent 16 should be in charge of sending home agent advertisement messages on behalf of the other home agents 16. Furthermore, a simple and efficient policy, such as highest/busiest or lowest/most available priority home agent 16, is able to be implemented as selection policies. The present invention. is not in any way limited to the specific policy or policies disclosed in this specification, and any suitable selection policy may be implemented for the present invention VDHAP.

The floating token is a mutually exclusive resource, which is owned by one home agent 16 at any given time. The floating token assigns VDHAP tasks, such as the processing of registration request, to a particular home agent 16 for a particular time period. The policy for moving the floating token among home agents 16 is able to be achieved in many different ways. In making the selection of the home agent 16, the following considerations are made for holding or releasing the floating token: 1) CPU utilization; 2) the number of registration requests waiting in the queue for service; 3) the period the token stayed with the current token holder (i.e. current home agent holder). The floating token must be used as a tool to select the home agent 16 who is currently assigned to process the incoming registration requests. The floating token policy must avoid causing problems such as deadlock, starvation, or race conditions, and the policy should allow equal opportunity for home agents 16 to own the token and allow good distribution of processing registration requests among home agents 16, resulting in better load distribution among home agents 16.

The present VDHAP provides two types of registration mechanisms of mobile nodes 11: 1) generic registration request and 2) deterministic registration request. For the generic registration request, the mobile node 11 sends a generic registration request to the home link 28. The generic registration request is a registration request with its destination address as a home subnet-directed broadcast or "All Home Agents" multicast address and the "H" bit set to one. Home agents 16 implementing the VDHAP will process these request as discussed later in this specification. For the deterministic registration request, the mobile node 11 has a knowledge about home agents 16 serving on the home link 28. The mobile node 11 selects one of the home agents 16 as a serving home agent 16 for its communication traffic with correspondent nodes 20. This method is used for VDHAP to be backwards compatible with present base mobile IP.

The overview of the VDHAP involves the following general concepts. The home agents 16 boot up, and they start to advertise their availability by each sending a multicast heartbeat message to other home agents 16 on the same home link 28. When a home agent 16 receives a heartbeat message from another home agent 16 which does not exist on its home agent list, a new entry for this home agent 16 is created in the home agent list and is updated with the information included in the heartbeat message. If a lifetime of a home agent list's entry expires, the home agent's entry is deleted from the home agent list. When this lifetime expiration occurs, this home agent 16 is declared as a failed home agent 16. All home agents 16 in the home link 28 will detect the failure of this home agent 16 since they will lose the heartbeat message from this failed home agent 16. When the failure recovery agents detect the failure of a home agent 16, one of them will be selected according to a policy based on a home agent priority to recover the operations of the mobile nodes 11 of the failed home agent 16.

The VDHAP provides a set up in which only a single home agent 16 on behalf of the other home agents 16 send the agent advertisements. The home agent 16 that is assigned to send the home agent advertisement is selected to be the token holder (i.e. floating token selection method) or by a priority based selection policy of the home agents 16. All home agents 16 receive a registration request, but only the selected or token holder (i.e. selected home agent 16) processes the registration request while the other home agents 16 silently discard their received requests. In the selection or token method, home agents 16 alternate the ownership of the token holder 16 among home agents 16. The alternating between assigned home agents 16 helps in distributing and balancing the load of processing registration requests among home agents 16. If one of the home agents 16 is overloaded with data traffic, it will attempt to distribute some of its load of mobile nodes 11 to other home agents 16.

Figure 1:
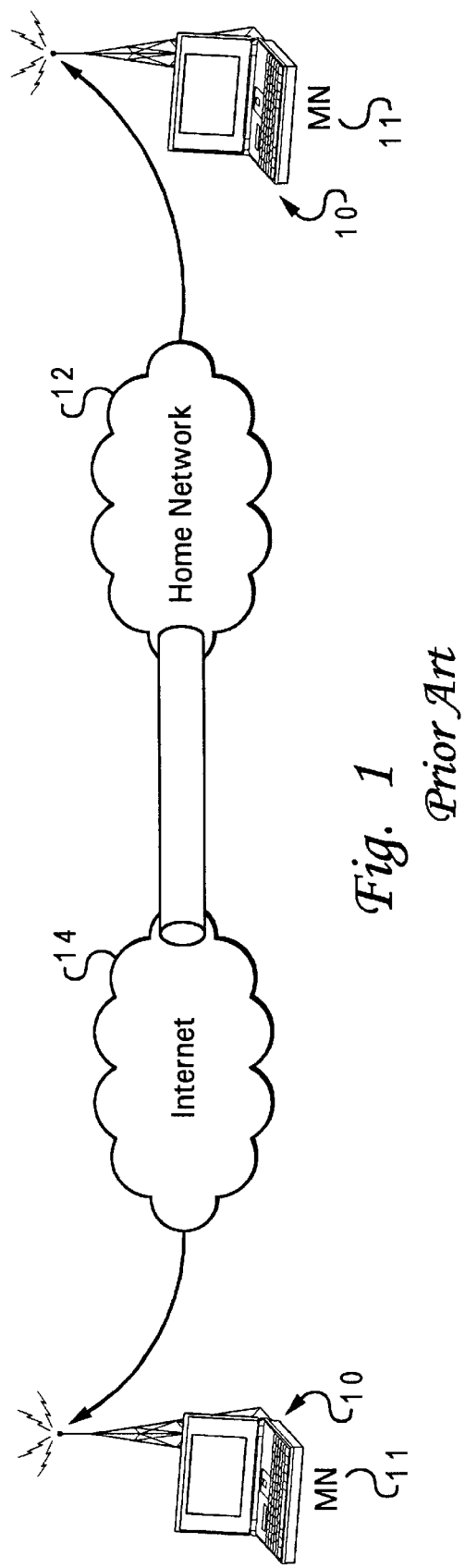
FIG. 1 is a prior art diagram showing an overall configuration of a mobile computer that is able to move from one location to another location and that communicates over the Internet and a home network with other systems or devices wherein the configuration requires the use of a protocol for such communication.
Figure 2:
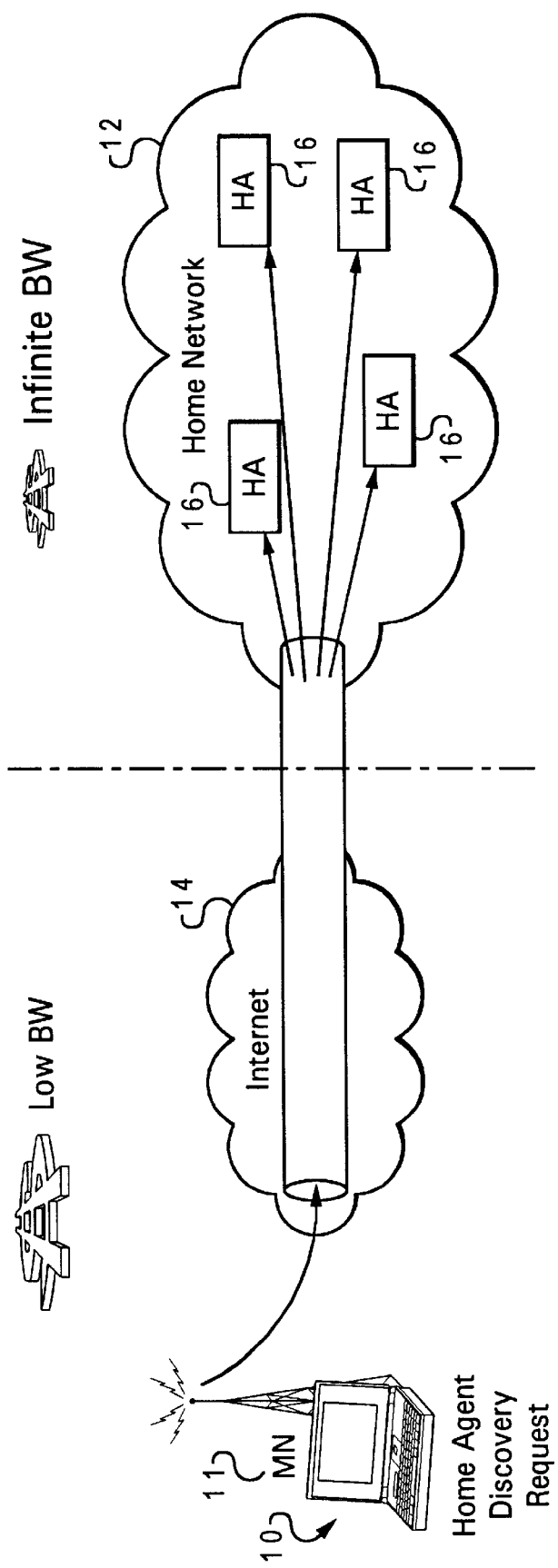
FIG. 2 is a prior art diagram showing the home agent discovery request process for a mobile node to home agents used in a computer protocol.
Figure 3:
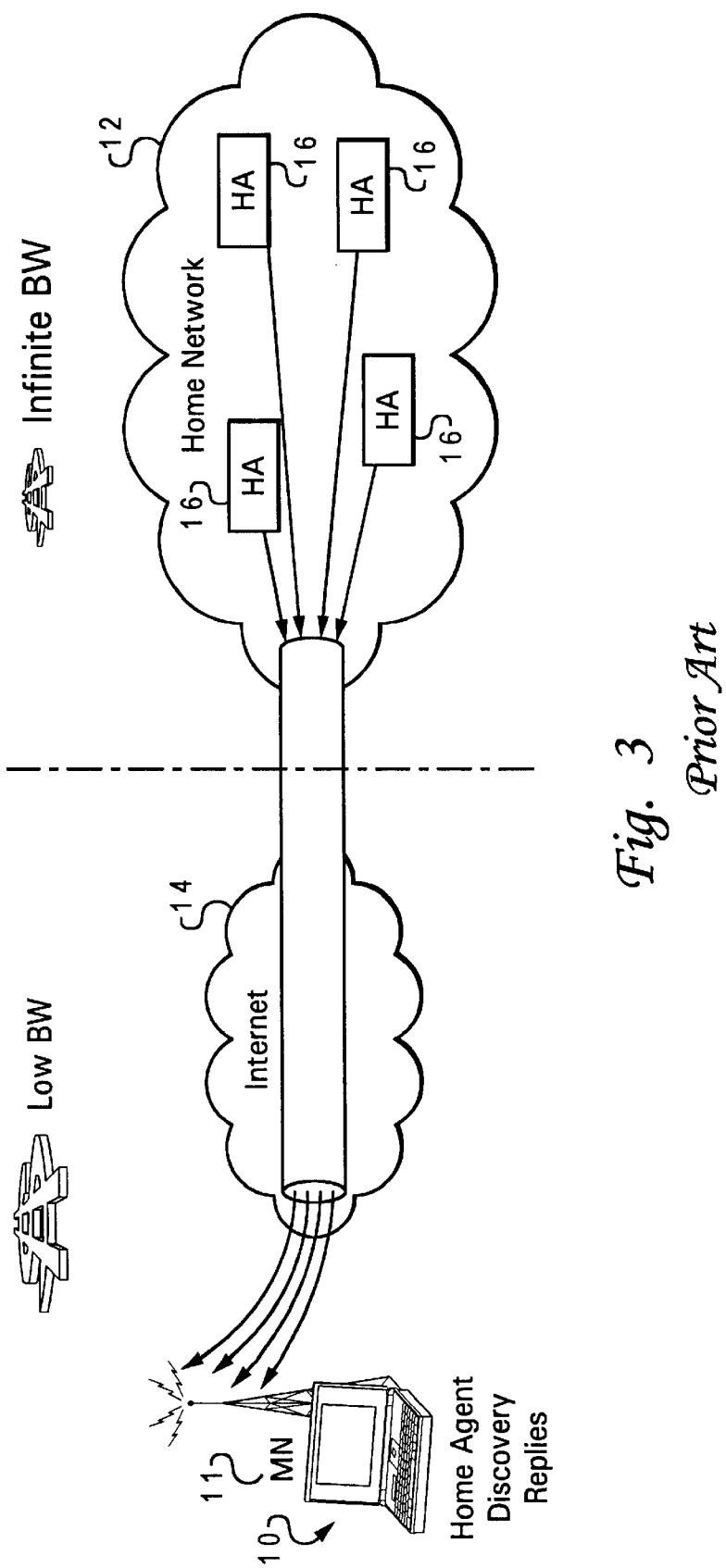
FIG. 3 is a prior art diagram showing the home agent discovery reply process for home agents to a mobile node used in a computer protocol.
Figure 12:
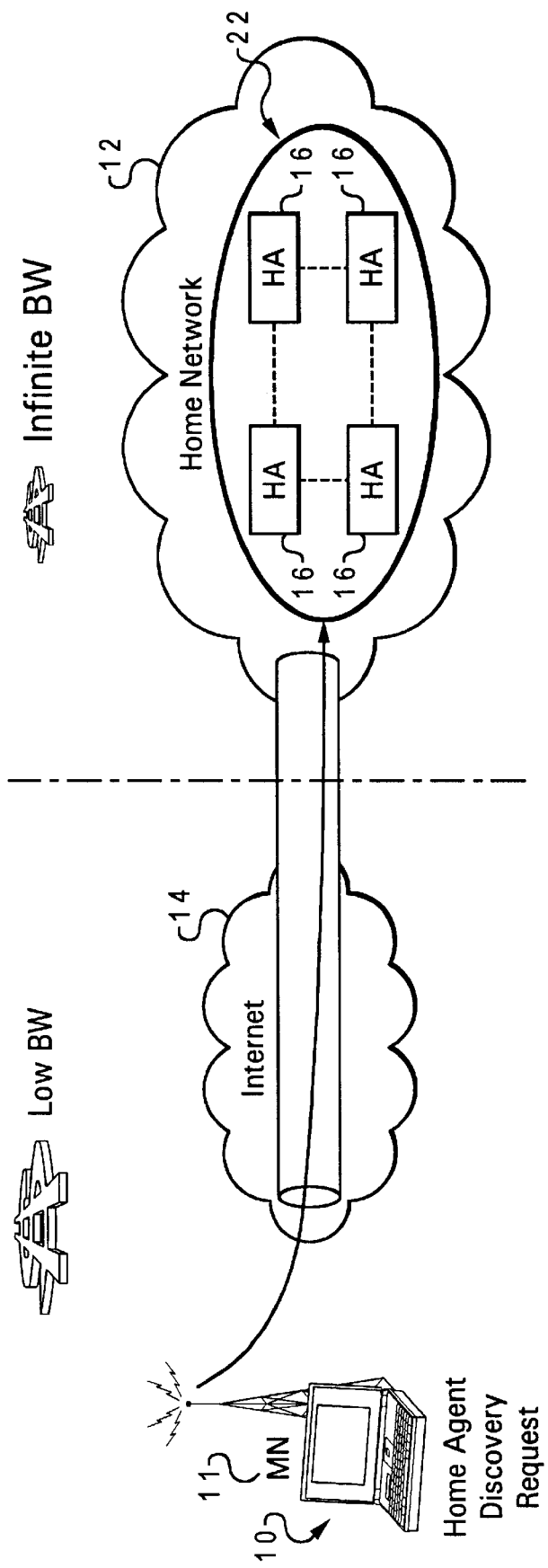
FIG. 12 is a diagram showing the home agent discovery request process for a mobile node to a virtual home agent used in the present invention virtual distributed home agent protocol.
Figure 13:
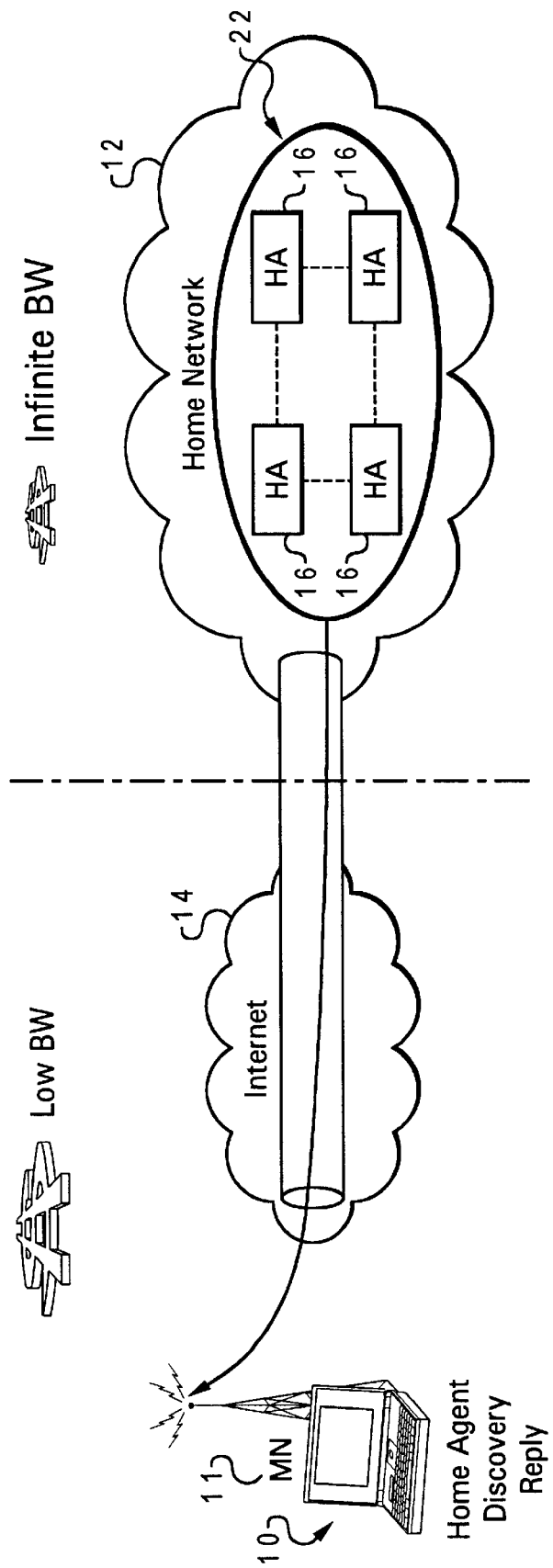
FIG. 13 is a diagram showing the home agent discovery reply process for a virtual home agent to a mobile node used in the present invention virtual distributed home agent protocol.

With reference now to the figures and in particular with reference to FIGS. 12 to 15, the rules for processing home agent discovery requests and replies and registration and de-registration requests and for performing home agent advertisement are now discussed. The VDHAP allows a mobile node 11 to send or broadcast a home agent discovery request to each of the home agents 16 in the VHA 22 of the home network 12 as shown in FIG. 12 similar to the prior art where a mobile node 11 has to send or broadcast multiple home agent discovery requests to each and every home agent 16 as shown in FIG. 2. However, in the present invention, only a single home agent 16 that is assigned to process the home agent discovery request respectively processes the request. Furthermore, the VDHAP allows the home network 12 to have to only provide a single home agent discovery reply to the respective request as shown in FIG. 13 in contrast to the prior art where each and every home agent 16 that receives a request within the home network 12 has to send a reply to a received request as shown in FIG. 3. Therefore, the VDHAP provides the significant advantage of having to deal with a single communication between the mobile node 11 and the home network 12 and a single communication between the home network 12 and the mobile node 11 as compared with multiple communications therebetween that are needed in prior art protocols.

Figure 14:
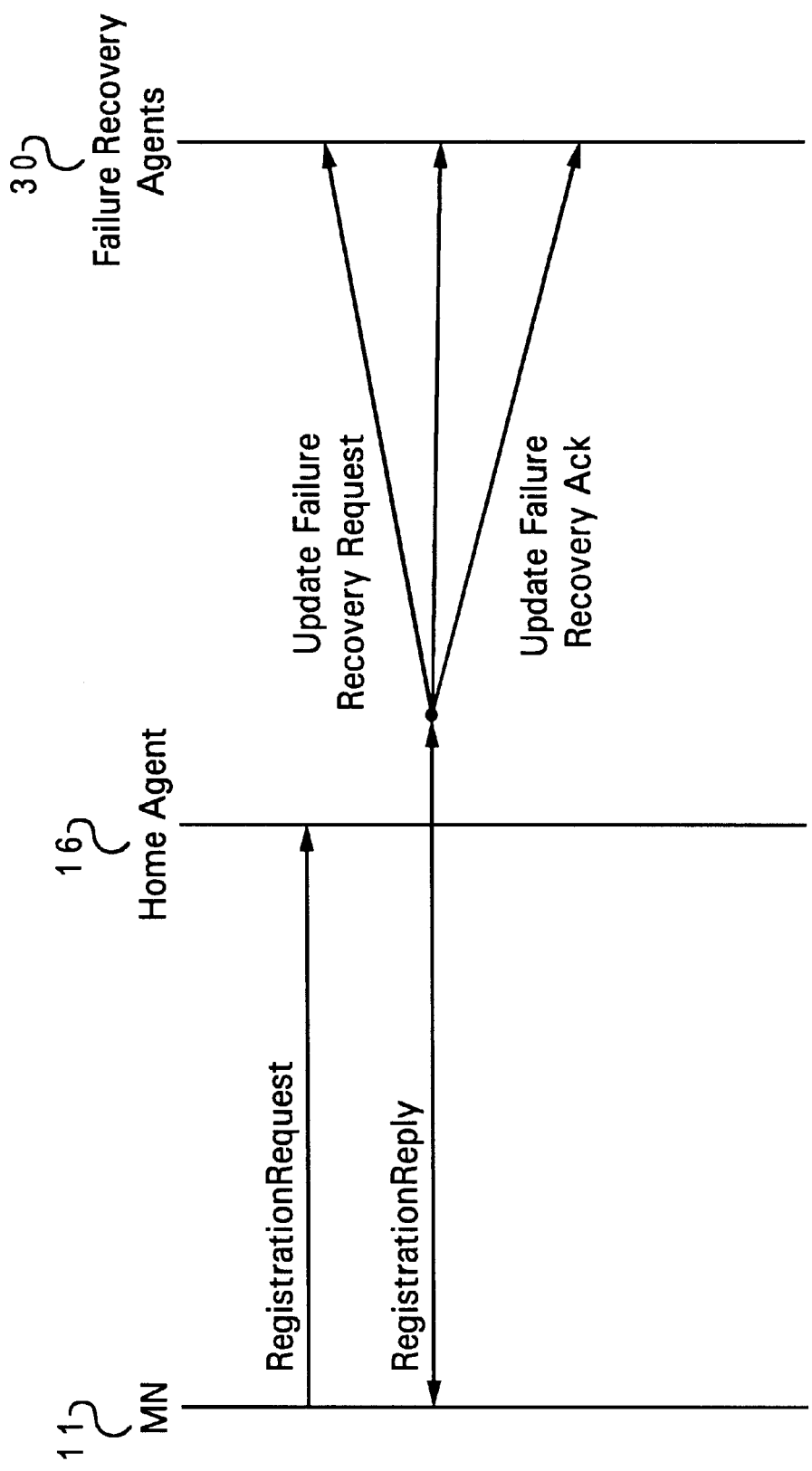
FIG. 14 is a diagram illustrating the process of a registration request for the present invention virtual distributed home agent protocol.

With reference now to the figures and, in particular with reference to FIG. 14, the home agent 16 which is the selected home agent 16 or the home agent 16 which holds the. token 32 (see FIG. 17) processes the incoming registration request. The registration request is processed according to a floating token method or a priority based selection policy of the home agents 16 in selecting the registering home agent 16, which will both later be discussed in more detail. In FIG. 14, after the home agent 16 executes the registration request message, it sends an update failure recovery request message to each failure recovery agent to update their databases with the failure recovery information of the mobile node 11. When the mobile node 11 returns back to its home agent 16, a deregistration request is sent. The deregistration request from the mobile node 11 may or may not be supported by VDHAP. For a supported deregistration request, when the home agent 16 receives the request with a lifetime of zero, the "H" bit is set to one, and the destination address is a subnet-directed broadcast or multicast address, the request will be processed by all home agents 16 regardless of who owns the token as follows: 1) if the home agent 16 is a failure recovery agent, it will remove the information related to the mobile node 11 from its recovery information database; 2) if the mobile node 11 is already registered with the current home agent 16, then the request will be processed; 3) otherwise, the registration request is ignored. For a non-supported deregistration request, when the home agent 16 receives the request with a lifetime of zero and the "H" bit set to zero, then the deregistration request is processed.

Figure 4:
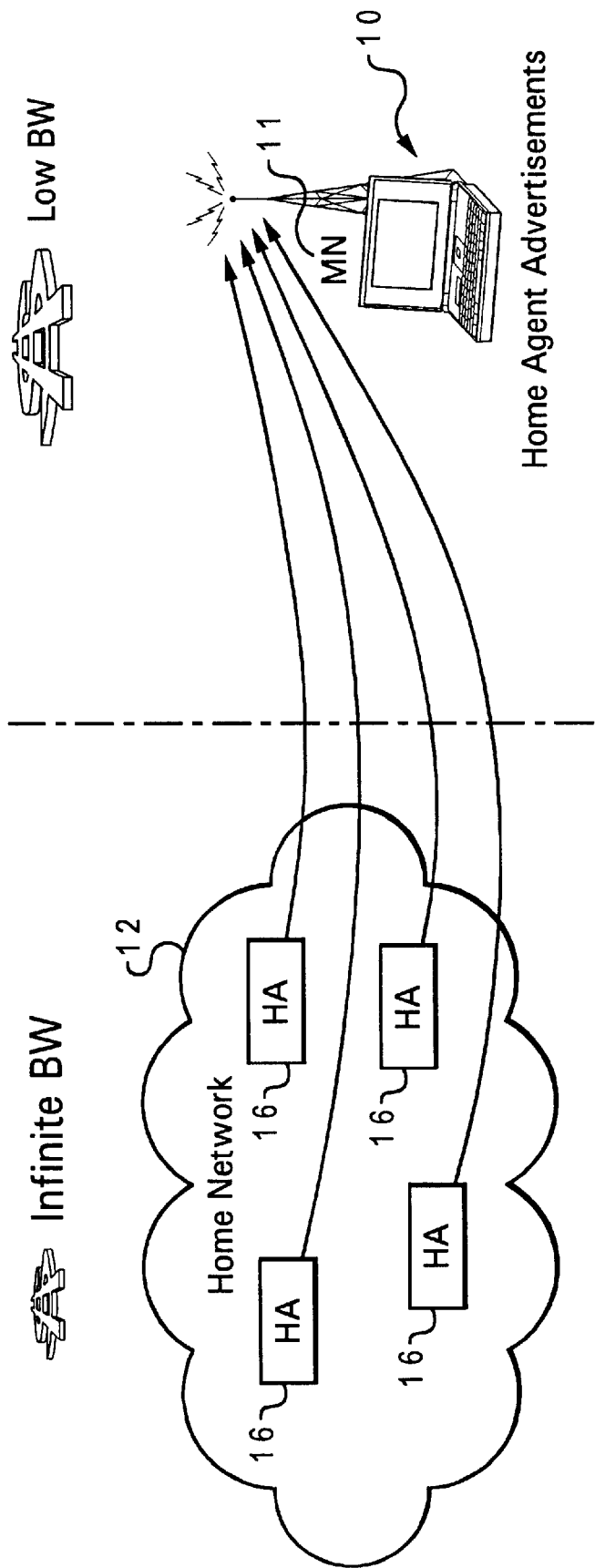
FIG. 4 is a prior art diagram showing the home agent advertisement process for home agents to a mobile node used in a computer protocol.
Figure 5:
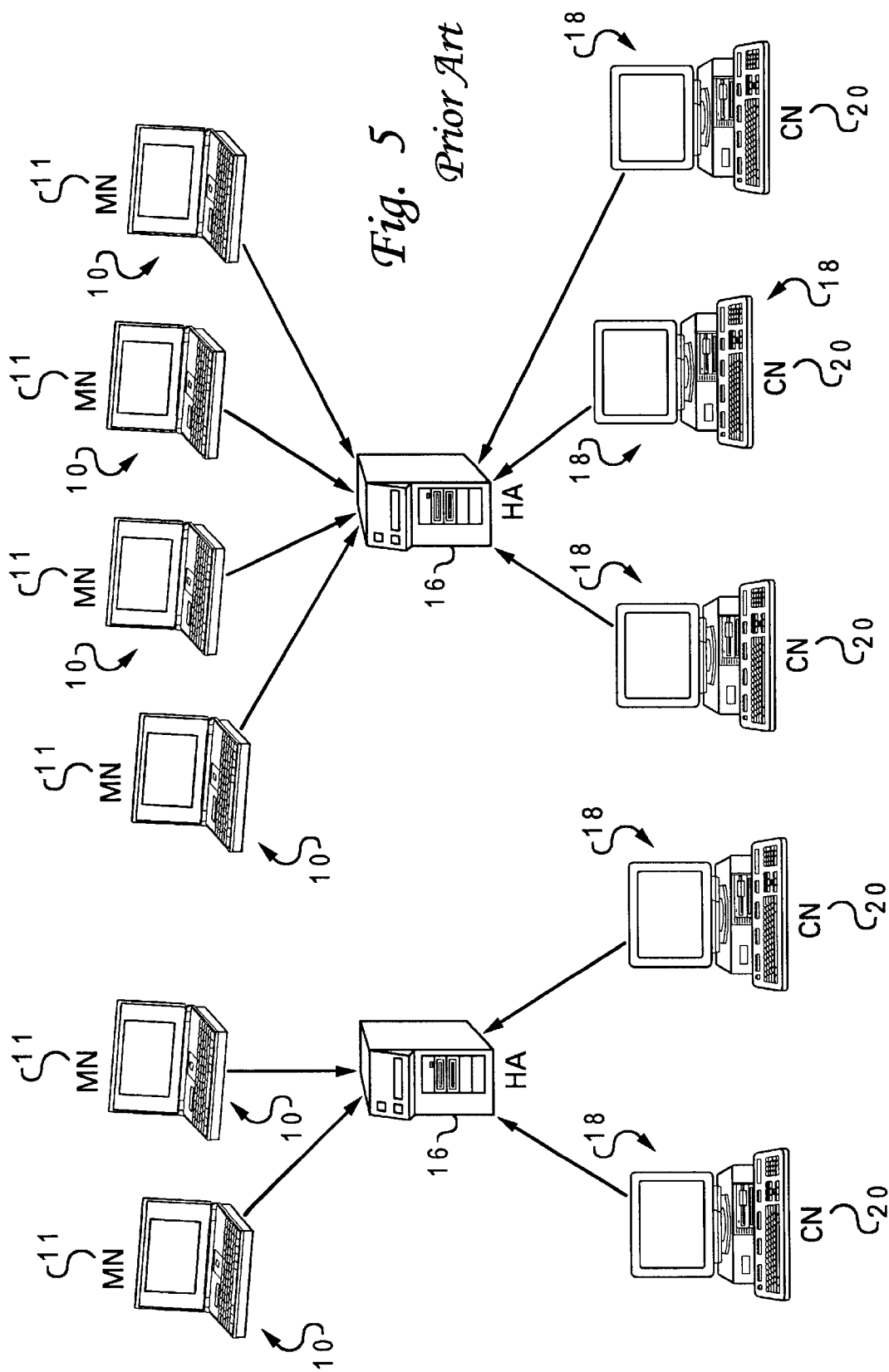
FIG. 5 is a prior art diagram showing mobile nodes coupled to home agents wherein the uneven load distribution of mobile nodes to home agents exists.
Figure 6:
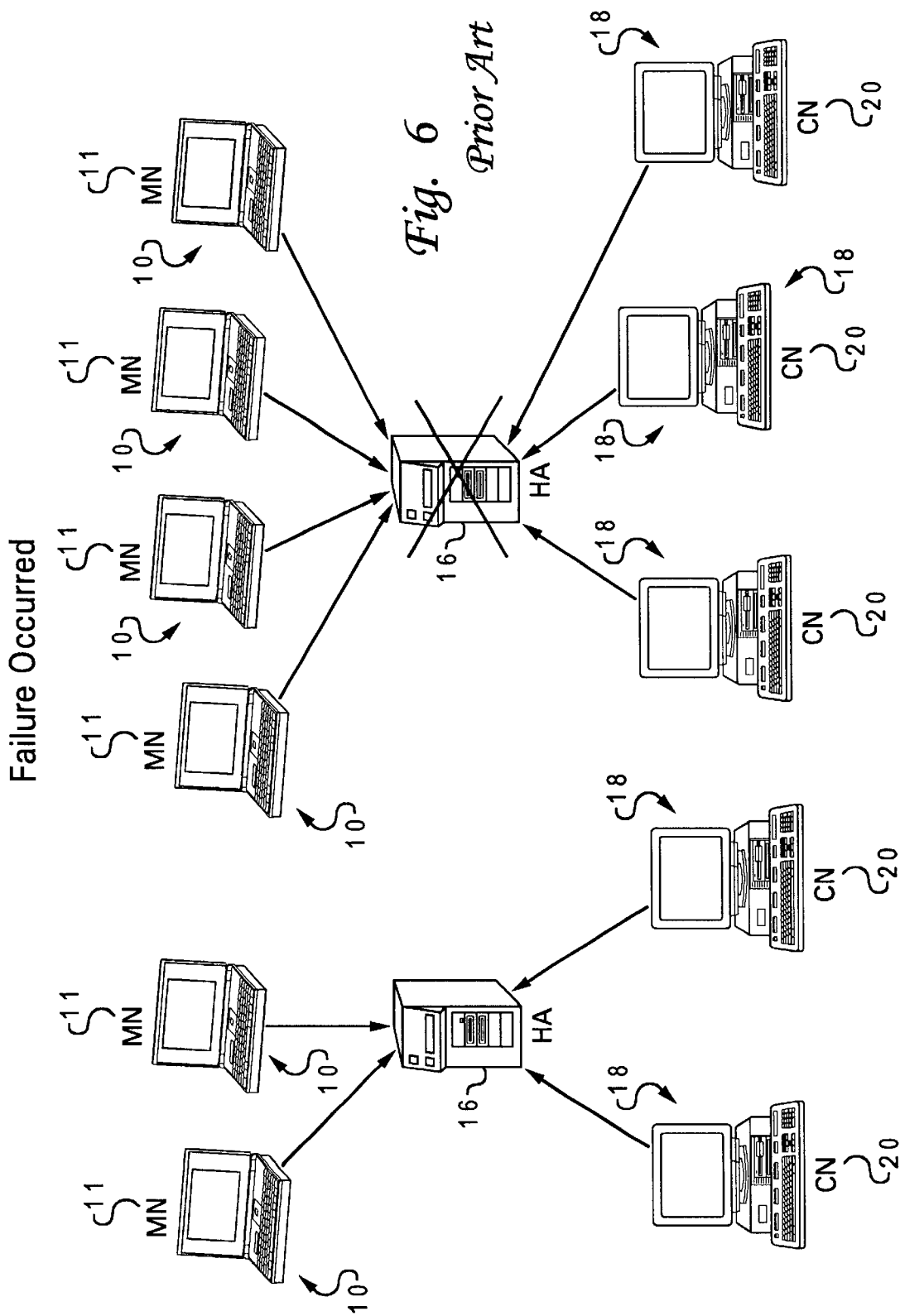
FIG. 6 is a prior art diagram similar to FIG. 5 showing mobile nodes coupled to home agents and further showing a failure or error occurring at one of the home agents.
Figure 7:
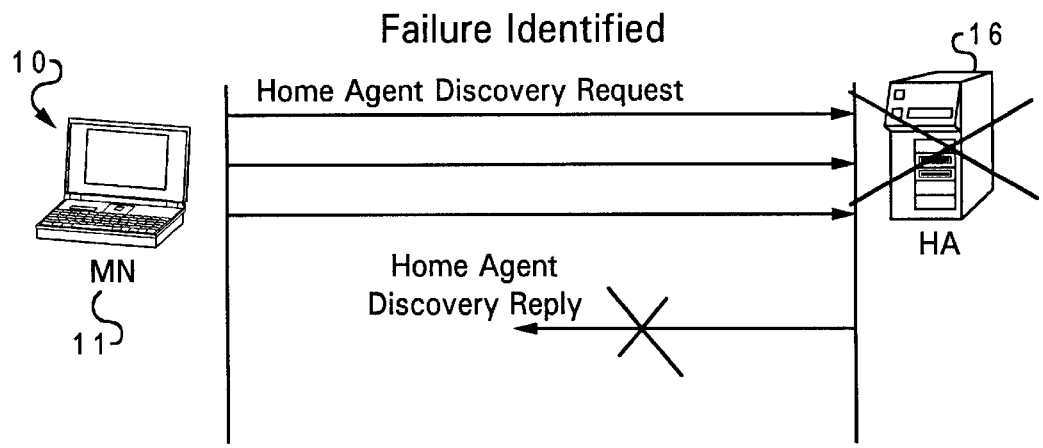
FIG. 7 is a prior art diagram showing the registration request and registration reply between the mobile node and the home agent wherein the failure or error has been identified.
Figure 8:
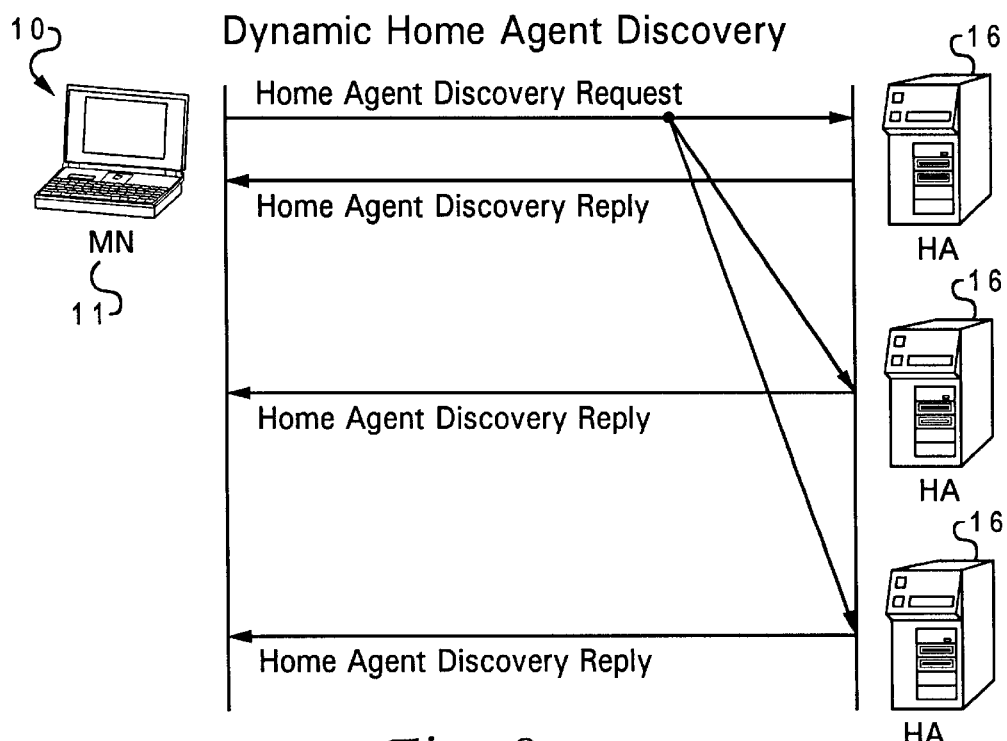
FIG. 8 is a prior art diagram of the dynamic home agent discovery process that is executed between the mobile node and other home agents after a failure or error has been identified at the home agent in order to re-register the mobile node to a properly working home agent.
Figure 9:
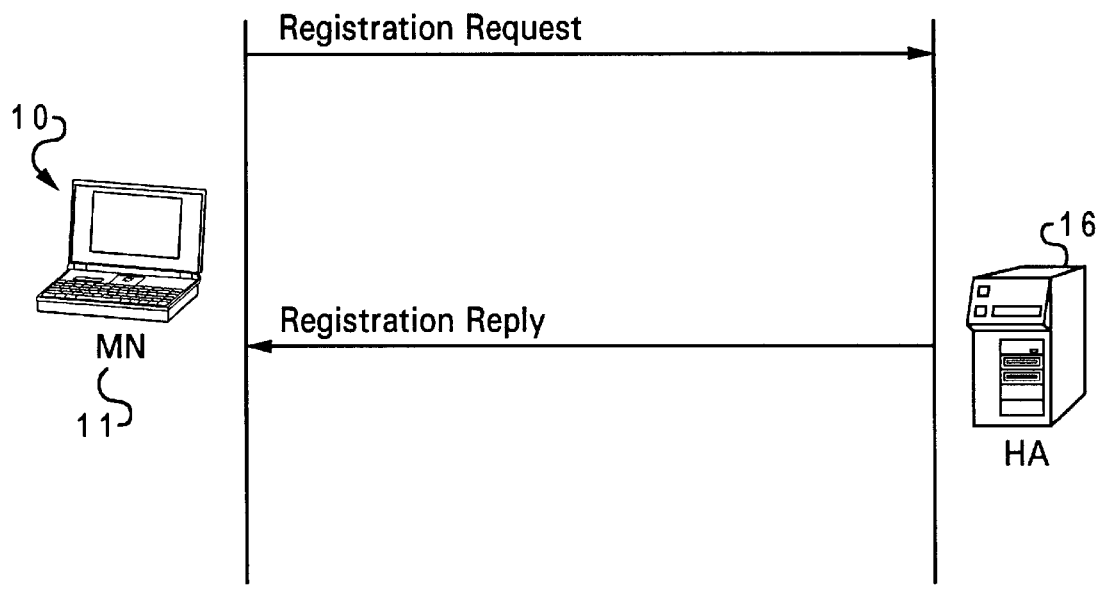
FIG. 9 is a prior art diagram of the mobile node registering again to a new home agent after a failure or error has occurred at a previously registered home agent.
Figure 15:
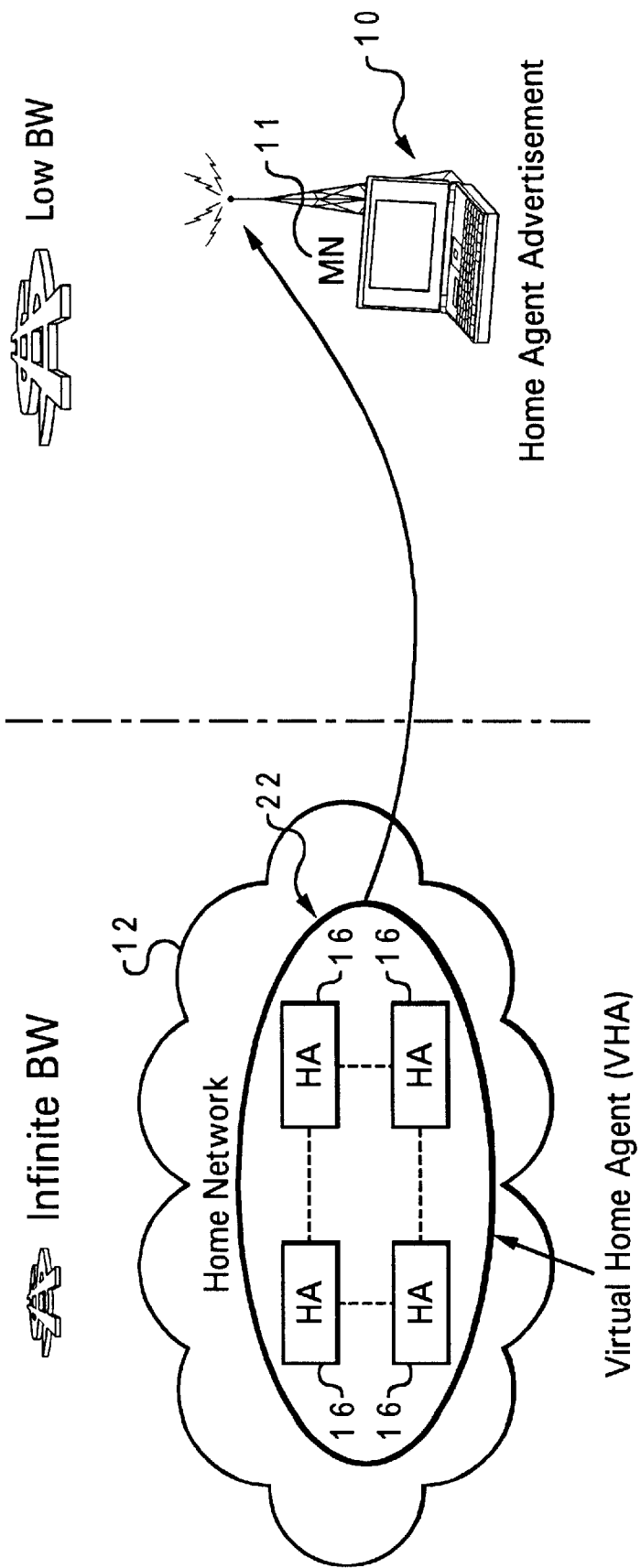
FIG. 15 is a diagram showing the home agent advertisement process from a virtual home agent to a mobile node used in the present invention virtual distributed home agent protocol.

If multiple home agents 16 exist on the home link 28, a possibility of multiple home agents 16 sending agent advertisements within the same agent advertisement lifetime period exists. With reference now to the figures and in particular with reference to FIG. 15, a single home agent 16 is selected to send agent advertisements on behalf of the other home agents 16 according to one of the following rules: 1) the current token holder is responsible for sending the agent advertisement message; 2) a home agent is selected to be in charge of sending agent advertisement messages according to a policy based on home agent priorities (i.e. policy could be based on selecting home agent who has the highest or lowest priority). Therefore, the present VDHAP sends only a single home agent advertisement message from the home network 12 and VHA 22 to the mobile node 11 as shown in FIG. 15 in contrast to the prior art protocol that requires each and every home agent 16 in the home network 12 to send a home agent advertisement message to the mobile node 11 as shown in FIG. 4.

Figure 16:
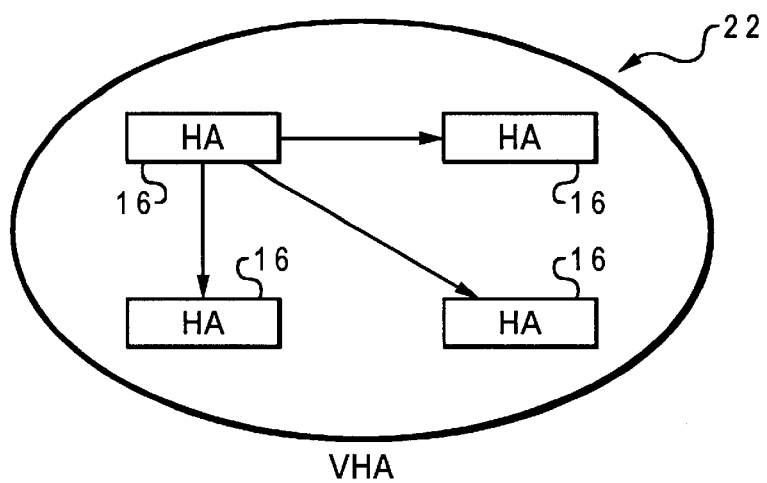
FIG. 16 is a diagram showing load re-distribution if one of the home agents used in the present invention virtual distributed home agent protocol becomes overloaded.

In order to provide a fairer load distribution among home agents 16, the present VDHAP distributes the processing of registration requests and data traffic of mobile nodes 11 among home agents 16. With reference now to the figures and in particular with reference to FIG. 16, if one of the home agents 16 is overloaded, it distributes the extra load to the other home agents 16. Two mechanisms are proposed to distribute load more fairly among home agents 16: 1) Floating Token Mechanism and 2) Load Threshold Mechanism.

Figure 17:
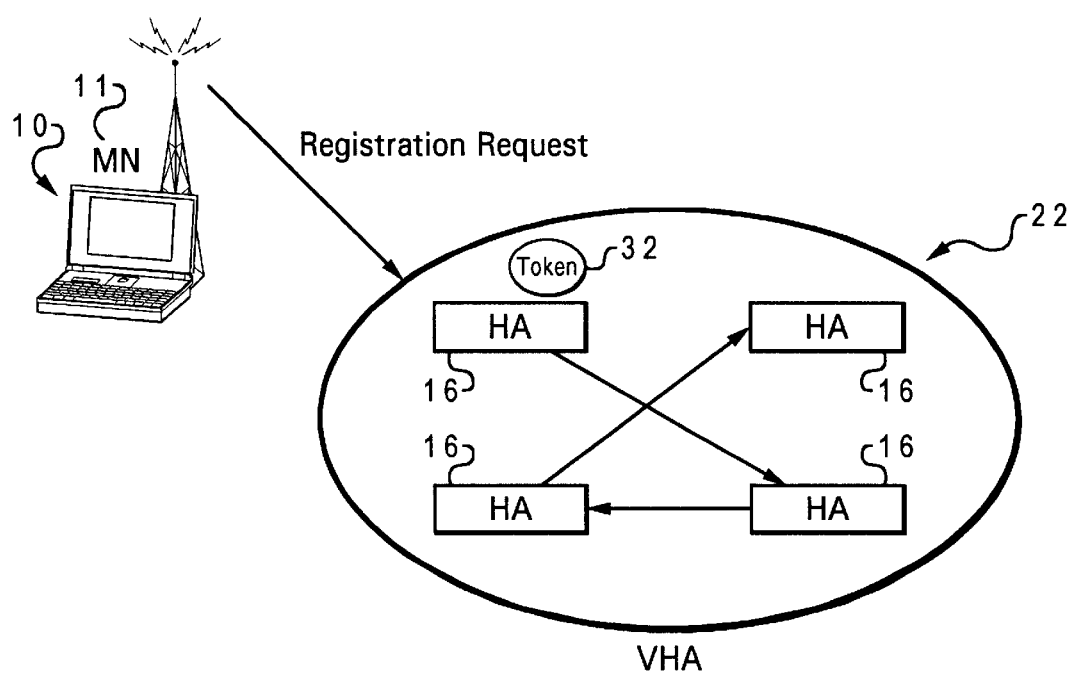
FIG. 17 is a diagram of the floating token process used by the virtual home agents to handle registration requests in the present invention virtual distributed home agent protocol.

With reference now to the figures and in particular with reference to FIG. 17, the floating token mechanism is now described in detail. In FIG. 17, the home agent 16 who owns the floating token 32 processes the incoming home agent discovery/registration request message(s) from the mobile node(s) 11. Since the home agents 16 alternate ownership of the floating token 32, then a chance exists for every home agent 16 to process some of the incoming home agent discovery/registration requests. The home agents 16 may include the following considerations when making the decision for holding or releasing the token 32: 1) CPU utilization; 2) number of requests waiting in the queue for service; 3) period the token 32 stayed with the current token holder.

For the load threshold mechanism, the home agent 16 moves some of its load of mobile nodes 11 into other home agents 16 when its load exceeds a certain threshold load. The present invention is not limited to a specific policy of selecting the target home agent 16 to receive the extra load, and any suitable policy may be used. In fact, policies based upon load information or statistical information may be used.

Figure 18:
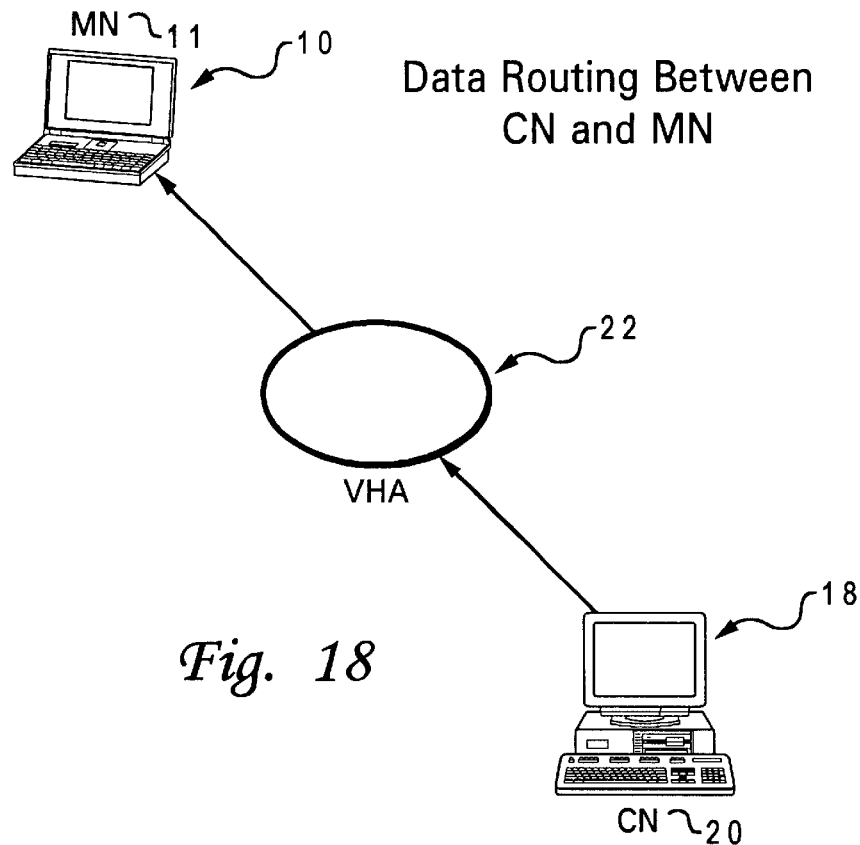
FIG. 18 is a general diagram illustrating data from a correspondent node to a mobile node being intercepted by a virtual home agent.

FIG. 18 is a diagram illustrating the data routing from a correspondent node 20 of a computer system 18 to the VHA 22 and then to the mobile node 11 of a mobile computer 10. The VHA 22 contain home agents 16 that are linked together and in communication with each other in a home link 28. A home agent 16 is initialized by providing information about its neighboring home agents 16 into its configuration file(s) to help quickly build its home agent list when the home agent 16 boots up. Otherwise, the newly starting home agent 16 has to wait for heartbeat messages from its neighboring home agents 16 to build its home agent list. Also, some of these home agents 16 should be configured as failure recovery agents. The present invention is not limited to a specific policy of configuring or selecting failure recovery agents, and any suitable policy may be used. The home agents 16 communicate with each other by periodically sending each other heartbeat messages to send and/or update information between the home agents 16.

Figure 19:
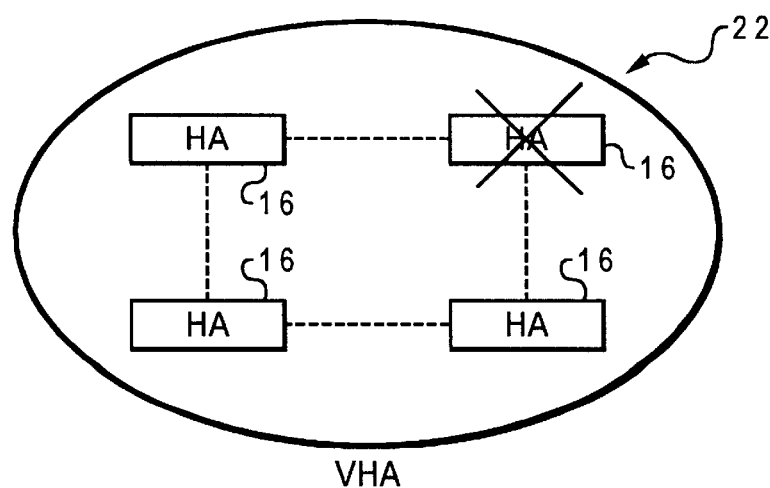
FIG. 19 is a diagram illustrating home agent failure detection by using and communicating heartbeat messages among the home agents within a virtual home agent of the present invention virtual distributed home agent protocol.

The present VDHAP provides backup and recovery home agent services to a mobile node 11 when a home agent 16 has failed and provides an efficient way of home agent failure or error recovery. Among the home agents 16 coupled to a home link 28, at least some of the home agents 16 should be configured as failure recovery agents. All home agents 16 including failure recovery agents periodically exchange heartbeat multicast messages. With reference now to the figures and in particular with reference to FIG. 19, one of the home agents 16 in communication with the others has failed. At least some of the other home agents 16 are designated as failure recovery agents. If these other home agents 16 and/or failure recovery agents do not receive a heartbeat message for this one home agent 16 over its life time period, then they conclude that this home agent 16 has failed. In other words, home agents 16 will send heartbeat messages to inquire about each other. If a home agent 16 has not been heard or responded for awhile, then the failure recovery agent asks other failure recovery agents about the home agents 16 and/or neighboring home agents 16 start asking about the home agent 16. A failure recovery agent is selected to recover from the home agent failure according to a certain configuration or selection policy based on home agent policy, that is, the failure recovery agent distributes the load of the failed home agent 16 to other home agents 16. For example, a policy may be defined as one where the failure recovery agent is selected based on the lowest or highest priority in charge of home agent failure recovery. The selected failure recovery agent distributes the load of the mobile nodes 11 registered with the failed home agent 16 among the available home agents. 16.

Figure 20:
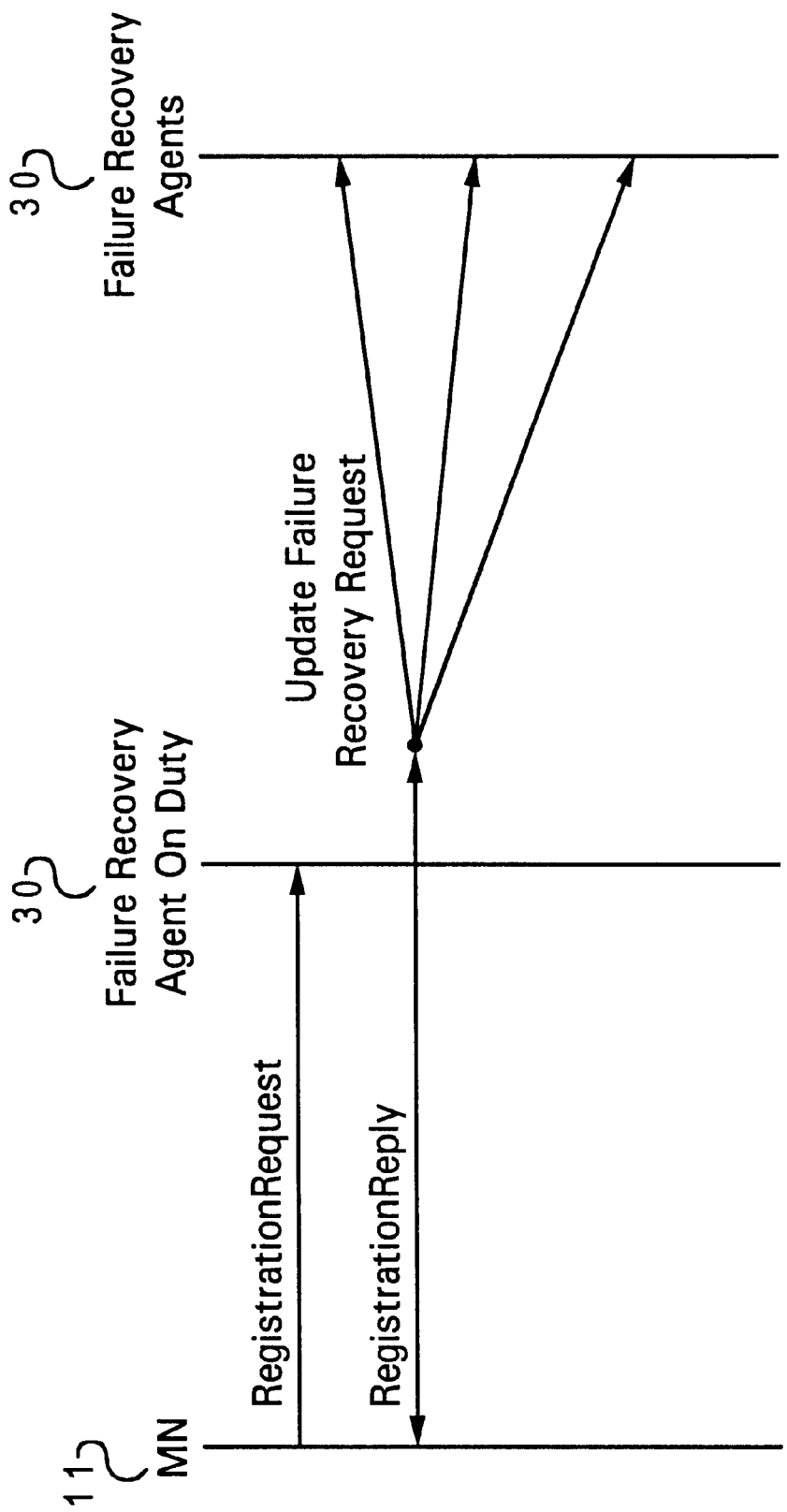
FIG. 20 is a diagram illustrating the failure/error recovery procedure for the present invention virtual distributed home agent protocol.

FIG. 20 illustrates the failure recovery procedure. When a home agent 16 receives a registration request from the failure recovery agent, the home agent 16 updates its binding list with information of the mobile node 11, sends a gratuitous advertisement message to the other home agents 16, and sends a registration reply message to the failure recovery agent to confirm the execution and acceptance of the request. The failed home agent 16 must send an update recovery information request message to update the database of the failure recovery agent with the failure recovery information of the mobile node 11. FIG. 20 shows the recovery procedure that the failure recovery agent executes to distribute the load of the failed home agent 16 to the available home agents 16.

Figure 21:
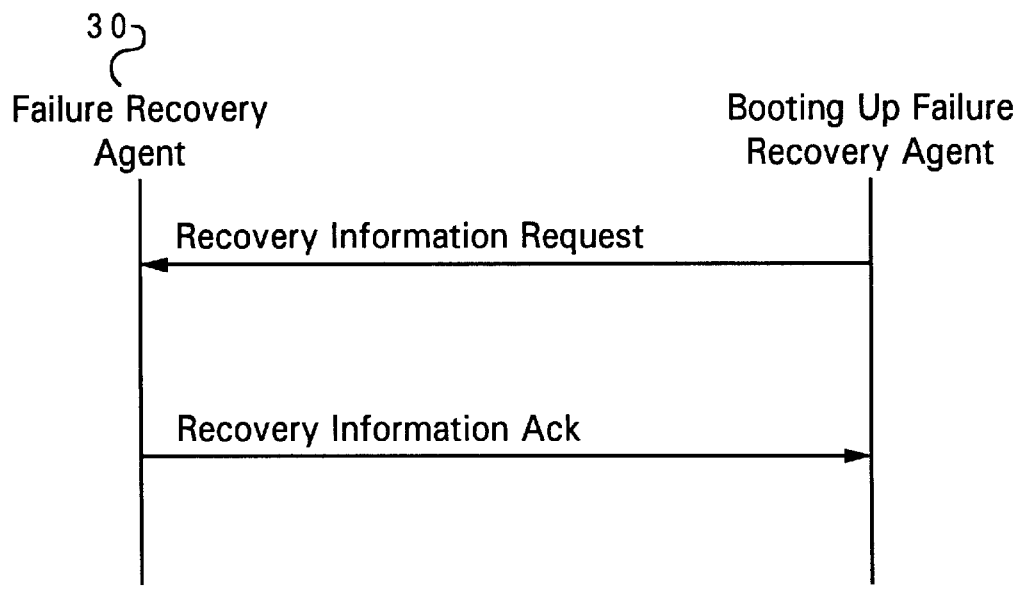
FIG. 21 is a diagram illustrating the recovery information process obtained from a failure recovery agent for the present invention virtual distributed home agent protocol.
Figure 22:
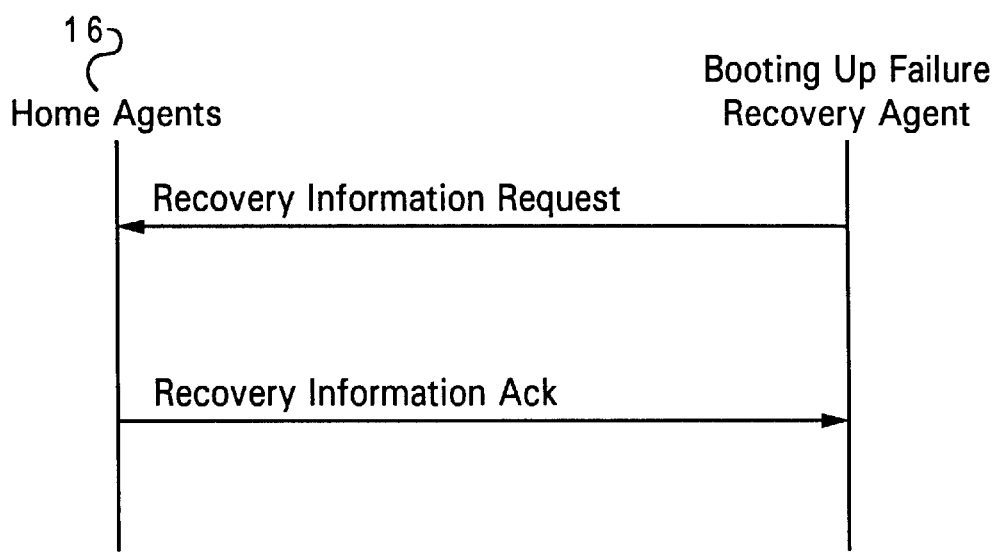
FIG. 22 is a diagram illustrating the recovery information process obtained from home agents for the present invention virtual distributed home agent protocol.

If the failed home agent 16 is the one that is currently holding the token 32, then one of the failure recovery agents regenerates the floating token 32. The regeneration steps are as follows: 1) the failure recovery agent sends a multicast token ownership query message to all home agents 16 in the home link 28; 2) each home agent 16 that receives the token ownership query message responds back with a token ownership ack message; 3) if one of the home agents 16 has the floating token ownership, then the failure recovery agent updates its home agent list with the current floating token holder 32, and if none of the home agents 16 is holding the token 32, then the failure recovery agent regenerates the floating token 32. With reference now to the figures and in particular with reference to FIGS. 21 and 22, the regeneration process is generally illustrated. FIG. 21 shows that when the failure recovery agent boots up, it asks one of its neighboring failure recovery agents to supply it with recovery information for other home agents 16 on the home link 28. FIG. 22 shows that if only one home agent 16 is configured to be a failure recovery agent, then this agent 16 asks the other home agents 16 to supply it with the recovery information. After the failure recovery agent obtains the respective recovery information, a new floating token holder 32 is designated and selected.

The present VDHAP may be configured so that the mobile node 11 is able to handle and send generic registration and deregistration requests. A generic registration request has similar structure to the deterministic registration. request. The field values are similar except for the following: For the IP fields, if the mobile node 11 supports a VDHAP and registers using co-located care-of address, it must set the destination address to the subnet-directed broadcast address for the home network 12. Otherwise, the destination address value follows the same rules for the deterministic registration request. The rest of the IP fields are set to the values following the rules for the deterministic registration request. For the registration request flags field, if the mobile node 11 supports the VDHAP, it must set the "H" bit equal to one. The mobile node 11 which is supported by the VDHAP must set the home agent field to the subnet-directed broadcast address for a home network 12.

A generic deregistration request has similar structure to the deterministic registration request. The field values are similar except for the following: For the IP fields, if the mobile node 11 supports a VDHAP and deregisters using co-located care-of address, then the mobile node 11 must set the destination address to the subnet-directed broadcast address for the home network 12. If the mobile node 11 returns back home, it should set the destination address to the "All Mobility Agents" multicast address. Otherwise, the destination address value follows the rules for the deterministic registration request. The rest of the IP fields are set to the values following the rules for deterministic registration requests. For registration request flags field, if the mobile node 11 supports the VDHAP, it must set the "H" bit equal to one. For the home agent field, if the mobile node 11 supports the VDHAP and returns back home, it must set this field to the "All Mobility Agents" multicast address. Otherwise, it must be set to the subnet-directed broadcast address for a home network 12 or "All Home Agents" multicast address.

One of the goals of the present VDHAP is to be able to hide the information of the IP addresses of home agents 16 from mobile nodes 11. This design goal enables a private network to hide its nodes' IP addresses from the outside world. The implementation of VDHAP over a private network therefore becomes very feasible. A mobile node 11, which belongs to a private network and roams over a public network, is able to register with its private network using the following steps: 1) the mobile node 11 constructs a registration request with "All Home Agent" multicast address as a destination address; 2) the mobile node 11 encapsulates this registration request within a SKIP header wherein the SKIP header uses the firewall destination address to forward the encapsulated message to the firewall of the private network, and this encapsulated message is sent to the firewall. When the firewall receives the encapsulated message, it recovers the original registration request message and multicasts this registration request to all home agents 16 on the private network. A similar registration technique is able to be used to register a mobile node 11, which is roaming over a private network, with their home agents 16 that implement a VDHAP over a private network.

Therefore, the present VDHAP provides the ability of information of home agents 16 that do not necessarily have to be broadcast or sent to be hidden from the mobile node 11 (i.e. hiding of home agent information). Also, the present VDHAP provides back up and recovery home agent services in the event that a home agent has failed and provides an efficient way of recovering from such home agent error or failure (i.e. error/failure recovery). Furthermore, the present VDHAP provides more even and fairer distribution among home agents 16 of the loads of mobile nodes 11. The present VDHAP minimizes the messaging over air interface. The need for an automatic home agent discovery algorithm is minimized, and the home agent field in the registration reply message is eliminated. The present VDHAP provides a more fault tolerant system. The VDHAP operates and functions with at least one VHA 22, and the home agent failure recovery is shielded from the mobile node 11. Traffic load is distributed across all home agents 16, and the utility operations and functions are kept within the sub-network. Load distribution and fault management messages are kept within the VHA 22.

While the invention has been particularly shown and described with reference to a preferred embodiment, it will be understood by those skilled in the art that various changes in form and detail may be made therein without departing from the spirit and scope of the invention.

What is claimed is:

1. A virtual distributed home agent protocol method for managing and providing efficient communications and utilization of resources between a mobile node and home agents coupled to a home link, comprising the steps of:

encapsulating and integrating communications of the home agents into a single virtual home agent by selecting a designated home agent to communicate on behalf of the home agents to the mobile node;

communicating between the mobile node and the single virtual home agent; and performing processes based on the communication between the mobile node and the single virtual home agent.

2. The virtual distributed home agent protocol method according to claim 1 wherein the selecting step further comprises the step of:

selecting the designated home agent based on a home agent priority policy.

3. The virtual distributed home agent protocol method according to claim 2 wherein the home agent priority policy is based on a policy of busyness of the home agents.

4. The virtual distributed home agent protocol method according to claim 1 wherein the selecting step further comprises the step of:

selecting the designated home agent based on a floating token policy.

5. The virtual distributed home agent protocol method according to claim 4 wherein the floating token policy is based on assigning the designated home agent to be a token holder and switching the token holder to be one of the other home agents based on load factors.

6. The virtual distributed home agent protocol method according to claim 1 wherein the communicating step further comprises the step of:

communicating between the mobile node and a designated home agent that acts for the virtual home agent and communicates on behalf of the other home agents.

7. The virtual distributed home agent protocol method according to claim 6 wherein the step of communicating between the mobile node and a designated home agent further comprises the step of:

communicating a home agent discovery request from the mobile node to the virtual home agent.

8. The virtual distributed home agent protocol method according to claim 6 wherein the step of communicating between the mobile node and a designated home agent further comprises the step of:

communicating a home agent discovery reply from the virtual home agent to the mobile node.

9. The virtual distributed home agent protocol method according to claim 9 wherein the communicating step further comprises the step of:

communicating a home agent advertisement from the virtual home agent to the mobile node.

10. The virtual distributed home agent protocol method according to claim 9 wherein the step of communicating a home agent advertisement further comprises the step of:

communicating the home agent advertisement from a designated home agent that acts for the virtual home agent and communicates on behalf of the other home agents to the mobile node.

11. A virtual distributed home agent protocol method for managing and providing efficient communications and utilization of resources between a mobile node and home agents coupled to a home link, comprising the steps of:

encapsulating and integrating communications of the home agents into a single virtual home agent, by:

having each of the home agents maintain a home agent list containing information about each of the home agents coupled to the home link wherein the information includes at least an Internet protocol address of each of the other home agents, remaining lifetime of the home agents on the home agents list, and status of each of the home agents, and using heartbeat messages to communicate the information between each of the home agents;

communicating between the mobile node and the single virtual home agent; and performing processes based on the communication between the mobile node and the single virtual home agent.

12. The virtual distributed home agent protocol method according to claim 11 wherein the using heart beat messages step further comprises the step of:

determining a home agent to be a failed home agent when the heartbeat message has not been sensed from the home agent.

13. The virtual distributed home agent protocol method according to claim 12 wherein the determining step further comprises the steps of:

designating at least one home agent as a failure recovery agent, using the failure recovery agent to recover information relating to the failed home agent, and wherein the method further comprises the step of:

having the failure recovery agent reassign a new home agent to take over operations of the failed home agent.

14. The virtual distributed home, agent protocol method according to claim 13 wherein the using the failure recovery agent step further comprises the steps of:

designating multiple home agents as failure recovery agents, and using one of the failure recovery agents to obtain recovery information related to the failed home agent from the other failure recovery agents.

15. The virtual distributed home agent protocol method according to claim 13 wherein the using the failure recovery agent step further comprises the steps of:

designating only one home agent as a failure recovery agent, using the failure recovery agent to obtain recovery information related to the failed home agent from the other home agents, and wherein the method further comprises the step of:

having the failure recovery agent reassign a new home agent to take over operations of the failed home agent.

16. A virtual distributed home agent protocol method for managing and providing efficient communications and utilization of resources between a mobile node and home agents coupled to a home link, comprising the steps of:

encapsulating and integrating communications of the home agents into a single virtual home agent;

communicating between the mobile node and the single virtual home agent; and performing processes based on the communication between the mobile node and the single virtual home agent by using a designated home agent on behalf of the home agents for the virtual home agent to receive and process a request from the mobile node.

17. The virtual distributed home agent protocol method according to claim 16 wherein the performing processes step further comprises the step of:

using a designated home agent on behalf of the home agents for the virtual home agent to process and send a reply to the mobile node.

18. The virtual distributed home agent protocol method according to claim 16 wherein the performing processes step further comprises the step of:

fairly distributing loads from the mobile node among the home agents within the virtual home agent.

* * * * *